(12) United States Patent
Smith et al.

(10) Patent No.: US 8,400,911 B2
(45) Date of Patent: Mar. 19, 2013

(54) SYSTEM AND METHOD FOR PACKET TIMING OF CIRCUIT EMULATION SERVICES OVER NETWORKS

(75) Inventors: Roland A. Smith, Nepean (CA); Richard Sommerville, Nepean (CA); Ryan Greer, Nepean (CA); Van Sreng, Kanata (CA); Stephen Rayment, Ottawa (CA)

(73) Assignee: Belair Networks Inc. (CA)

( * ) Notice: Subject to any disclaimer, the term of this patent is extended or adjusted under 35 U.S.C. 154(b) by 877 days.

(21) Appl. No.: 11/674,001

(22) Filed: Feb. 12, 2007

(65) Prior Publication Data

US 2007/0189164 A1 Aug. 16, 2007

Related U.S. Application Data

(60) Provisional application No. 60/772,521, filed on Feb. 13, 2006.

(51) Int. Cl.
*G01R 31/08* (2006.01)
*H04L 12/28* (2006.01)
*H04J 3/00* (2006.01)
*G06F 15/16* (2006.01)

(52) U.S. Cl. ........ 370/225; 370/235; 370/389; 370/498; 709/228; 709/233

(58) Field of Classification Search .......... 370/229–230, 370/235, 356, 358, 395.53, 395.62
See application file for complete search history.

(56) References Cited

U.S. PATENT DOCUMENTS

| | | | |
|---|---|---|---|
| 4,204,093 A | | 5/1980 | Yeh |
| 5,142,551 A | * | 8/1992 | Borth et al. .................. 375/219 |
| 5,260,978 A | | 11/1993 | Fleischer et al. |
| 5,825,766 A | * | 10/1998 | Kobayashi et al. ...... 370/395.64 |
| 5,918,020 A | * | 6/1999 | Blackard et al. .............. 709/228 |
| 6,047,328 A | * | 4/2000 | Charny et al. ................. 709/233 |
| 6,111,878 A | * | 8/2000 | Powell ..................... 370/395.62 |
| 6,157,614 A | * | 12/2000 | Pasternak et al. ............ 370/236 |
| 6,574,213 B1 | * | 6/2003 | Anandakumar et al. ...... 370/349 |
| 6,738,916 B1 | | 5/2004 | Gladden et al. |
| 6,880,098 B1 | | 4/2005 | Huntsman |
| 6,922,415 B1 | * | 7/2005 | Bremer et al. ................ 370/449 |
| 6,959,064 B2 | | 10/2005 | Spijker et al. |
| 2002/0167954 A1 | | 11/2002 | Highsmith et al. |
| 2003/0058885 A1 | | 3/2003 | Sorenson et al. |
| 2003/0169776 A1 | | 9/2003 | Reesor |

(Continued)

FOREIGN PATENT DOCUMENTS

WO 2005/003880 A2 1/2005

OTHER PUBLICATIONS

P. Meyer, "Circuit Emulation Services-over-Packet and Cellular Backhaul", as published in analog Zone, Zarlink Semiconductor, 6 pages.

(Continued)

*Primary Examiner* — Brandon Renner
(74) *Attorney, Agent, or Firm* — Katten Muchin Rosenman LLP

(57) ABSTRACT

A system and method for managing information communication in a network includes a plurality of network nodes. A plurality of circuit emulation data flows are established between a first network node and at least a second network node. Different data transmission rates are assigned to each circuit emulation data flow such that the frequency of communicated packets is different at least for each circuit emulation data flow used for timing recovery to make the plurality of circuit emulation data flows substantially independent of each other. For example, different frame rates can be assigned to synchronous backhaul transmission links such that the frequency of the backhaul transmission rates is substantially independent of the circuit emulation flow rates.

36 Claims, 16 Drawing Sheets

U.S. PATENT DOCUMENTS

| | | | |
|---|---|---|---|
| 2004/0170237 A1 | 9/2004 | Chadha et al. | |
| 2004/0223518 A1 | 11/2004 | Repko et al. | |
| 2004/0264477 A1 | 12/2004 | Repko et al. | |
| 2004/0264478 A1 | 12/2004 | Van Der Valk et al. | |
| 2005/0003824 A1* | 1/2005 | Siris | 455/452.1 |
| 2005/0053076 A1 | 3/2005 | Repko et al. | |
| 2005/0220022 A1* | 10/2005 | DelRegno et al. | 370/235 |
| 2005/0220148 A1* | 10/2005 | DelRegno et al. | 370/498 |
| 2005/0242986 A1* | 11/2005 | Hanawa et al. | 342/70 |
| 2006/0007854 A1 | 1/2006 | Yu | |
| 2007/0009071 A1* | 1/2007 | Singh | 375/354 |
| 2007/0058604 A1* | 3/2007 | Lee et al. | 370/345 |
| 2007/0280102 A1* | 12/2007 | Vasseur et al. | 370/225 |
| 2008/0068983 A1* | 3/2008 | Dunbar et al. | 370/216 |

OTHER PUBLICATIONS

B. Ernhofer, et al., "Circuit Emulation Services-over-Packet and Standards Adoption", as published in analog Zone, Zarlink Semiconductor, 5 pages.

T. Frost, "Synchronisation for Circuit Emulation Services (CES) over Packet Networks", Presentation to the 3rd. Annual International Telecommunications Synchronisation Forum (ITSF), Oct. 2005, Zarlink Semiconductor, 21 pages.

"T1/E1 Service to Business Customers Over Fixed Packet Wireless", Diagrams for Web—Fixed Wireless, 1 page.

"Cellular Backhaul Over Carrier Ethernet, PON and DOCSIS Access", Diagrams for Web—Cellular Backhaul, 1 page.

U. Kumar, White Paper—"Circuit Emulation over Packet Networks", Zarlink Semiconductor Inc., Feb. 2002, 17 pages.

T. Frost, CommsDesign—"Circuit Emulation Provides Viable Alternative to VoIP", Zarlink Semiconductor, Jan. 27, 2004, http://www.commsdesign.com/showArticie.jhtml?articleID=17500765, 6 pages.

T. Frost, White Paper—"Circuit Emulation over Packet Switched Networks", Zarlink Semiconductor Inc., Jul. 2003, 10 pages.

"Circuit Emulation Services over Packet (CESoP) transport for MPLS, IP and Ethernet networks", 128, 256 and 1024 Channel CESop Processors, Data Sheet, ZL5011/11/14, Zarlink Semiconductor Inc., Oct. 2005, 103 pages.

International Search Report for International Application No. PCT/CA2007/000195.

Written Opinion of the International Searching Authority for International Application No. PCT/CA2007/000195 with a mailing date of Jun. 19, 2007.

Extended European Search Report for European Patent Application No. 07 71 0610 with a mailing date of Jan. 1, 2012.

* cited by examiner

SYSTEM AND METHOD FOR PACKET TIMING OF CIRCUIT EMULATION SERVICES OVER NETWORKS

This application claims priority under 35 U.S.C. §119(e) to U.S. Provisional Application No. 60/772,521, filed on Feb. 13, 2006, the entire contents of which are hereby incorporated by reference herein.

BACKGROUND

1. Field of the Invention

The present invention relates to information communication. More particularly, the present invention relates to a system and method for packet timing of circuit emulation services over networks.

2. Background Information

Wireless mesh networks are becoming increasingly deployed as multi-service wireless access platforms capable of offering services, such as, for example, WiFi (e.g., 802.11a, 802.11b, 802.11g, 802.11n and the like), WiMAX, VoIP, GSM, Edge, CDMA, iDEN, T1 Circuit Emulation Services over Internet Protocol (IP) and other like wireless protocols and standards. In addition to these services, the same wireless mesh networks can be subdivided into "virtual networks" where similar services are carried by competing venders using VLANs or other such techniques.

For reasons of cost effectiveness, the dominant mesh backhaul technologies are generally Time Division Duplexing (TDD) interfaces in which the media is shared between transmit and receive data flows. Such backhaul links can be point-to-point (P2P), point-to-multipoint (P2 MP), or multipoint-to-multipoint (MP2 MP). For WiFi, pre-WiMAX, or WiMAX based backhauls, these mesh networks can rely on an appropriate asynchronous technology to carry packets from one radio in the mesh to another radio in the mesh, in which packets are sent as they are received and the radio channel is available. Other technologies, such as WiMAX, can be synchronous in nature, where specific frame rates, such as, for example, 2.5 milliseconds (ms) or 5 ms frames, are used to transmit data from one WiMAX radio to another. Regardless of the technology and whether the wireless mesh network uses TDD or Frequency Division Duplexing (FDD), packet streams experience many bottle necks where packets must queue when sharing a common wireless media.

Most conventional data services that rely on TCP/IP, UDP, RUDP or other like data flows to carry traffic are designed to be resilient to variations in packet delay and jitter. In contrast, circuit emulation services "tunnel" a time-division multiplexing (TDM) circuit (e.g., T1 or E1) or other like type of circuit through a packet-switched network, thereby using the packet-switched network to emulate the behavior of the TDM circuit. The TDM or other like data is converted into a series of packets for communication through the packet-switched network. The TDM circuit is re-created upon receipt of the data at the destination, such that the TDM equipment on either end of the packet-switched-network are "unaware" that it is connected to anything other than a TDM circuit. However, many circuit emulation services tend to be sensitive to packet jitter. For example, with T1 Circuit Emulation over IP, the packet flows carry data and also carry timing information that is recovered using the packet arrival rate and/or relative packet arrival times. "Packet delay jitter" or, simply, "packet jitter" occurs, because there is some variation in the time each packets takes to reach the destination, even if all of the packets take the same route through the network. More specifically, such circuit emulation services tend to be sensitive to variations in packet jitter caused by other similar data streams or beating with "near" synchronous elements of the network, as well as total general packet loading of the traffic in the wireless mesh network.

Timing recovery can be critical in such circuit emulation services. For example, the source frequency at the entrance to the packet-switched network (referred to as the source clock) must be exactly reproduced at the destination (referred to as the regenerated clock). A difference in frequency between the source and regenerated clocks can result in, over time, a queue at the destination that either fills up or empties, depending on whether the regenerated clock is slower or faster than the source clock. Timing recovery is the process of determining the frequency of the source clock from the varied arrival rates of the packets to establish the regenerated clock.

Many circuit emulation services, such as providing a "traffic T1", are not sensitive to variations in packet jitter. These services employ algorithms that need only coarsely recover the timing so as to ensure that there are no underflows or overflows and that the timing falls within, for example, the T1 specification of ±32 parts per million as required in ANSI T1.102-1993 (R2005), "Telecommunications—Digital Hierarchy—Electrical Interfaces." Such a level of timing recovery is modest, requiring only that the buffer receiving the packet flow maintains an average position approximately in the middle of the allocated buffer space.

In contrast, circuit emulation services used for cellular backhaul have very strict timing requirements. Although these circuit emulation services are not required to meet the stringent specifications of a "timing T1" with a Maximum Time Interval Error (MTIE) of 2 μs (3 UI) in 15 minutes, such services are expected to be well-behaved, emulating a timing T1 that is stratum traceable to an absolute frequency. Cellular equipment relies on the absolute accuracy of the received T1 to determine the network timing. For GSM or Edge equipment, the cellular Base Transceiver Stations (BTSs) are required to extract the network timing from the received T1 circuit to within an absolute error of less than 50 parts per billion. Such a functional requirement can have deleterious results if not achieved. For example, if the BTSs in a network exceed an absolute clock accuracy of ±150 parts per billion, then mobility handovers begin to fail. It is therefore imperative that circuit emulation services used for cellular backhaul applications provide stratum-traceable, well-behaved timing.

However, jitter can occur in wired T1. More particularly, jitter can be common and expected in T1 signals. Timing jitter, from clocks or Phase Locked Loops (PLLs), as well as network transients—such as those that result from a Virtual Tributary (VT) where a sudden change in the clock frequency is experienced when the T1 is transported across a Synchronous Optical NETwork (SONET)—experiences a pointer adjustment. Such jitter events are typically of short duration and are generally accounted for by the designers of the BTS timing circuits.

Jitter variation, caused by a change in the fundamental timing statistics of a circuit emulation flow, is inherently non-linear in nature, and, therefore, can be very difficult to filter or eliminate when attempting to achieve accurate absolute clock recovery. A jitter variation, for example, caused by a race condition between two similar frequency packet flows, where the order of arrival of these two flows occasionally reverts across a shared resource or bottleneck within the wireless mesh, can result in periodic changes in packet delay jitter that are on the order of hundreds of microseconds. Consequently, if timing recovery was based on filtering out packet delay variation to achieve a simple PLL, a sudden phase shift in these statistics can be difficult to detect in filtering software. Even more indiscernible are jitter delay variations that appear as a gradual shift in packet delay and occur as competing similar rate packets slowly catch up to each other. These events are dependent upon the relative clock rates of the two data flows.

SUMMARY OF THE INVENTION

A system and method are disclosed for packet timing of circuit emulation services over networks. In accordance with exemplary embodiments of the present invention, according to a first aspect of the present invention, a system for managing information communication in a network includes a plurality of network nodes. A plurality of circuit emulation data flows are established between a first network node and at least a second network node. Different data transmission rates are assigned to each circuit emulation data flow such that the frequency of communicated packets is different for each circuit emulation data flow required or otherwise used for timing recovery to make the plurality of circuit emulation data flows substantially independent of each other.

According to the first aspect, the system can include a management module in communication with the plurality of network nodes. The management module can be configured to monitor and control the data transmission rates assigned to each circuit emulation data flow to ensure that the plurality of circuit emulation data flows are substantially independent of each other, and, more specifically, to ensure that the data flows required for timing purposes are independent of all other data flows. The management module can be configured to monitor and control the data transmission rates assigned to each circuit emulation data flow to ensure that each of the plurality of circuit emulation data flows is substantially independent of one of synchronous time division duplexing (TDD) backhaul links, synchronous frequency division duplexing (FDD) backhaul links, and combined TDD/FDD backhaul links. According to an exemplary embodiment of the first aspect, the network can comprise a mesh network, such as, for example, a wireless mesh network or the like.

According to a second aspect of the present invention, a system for managing information communication in a network includes a plurality of network nodes. A circuit emulation data flow is established between a first network node and a second network node. The circuit emulation data flow comprises a transmit data flow and a receive data flow. A first data transmission rate is assigned to the transmit data flow and a second data transmission rate is assigned to the receive data flow such that the transmit data flow at the first data transmission rate is substantially independent of the receive data flow at the second data transmission rate.

According to the second aspect, the first data transmission rate and the second data transmission rate can be substantially identical. At least one of the network nodes can comprise a timing recovery module configured to compensate for non-linear jitter variations resulting from beating of the transmit and receive data flows. The system can include a management module in communication with the plurality of network nodes. The management module can be configured to monitor and control the first and second data transmission rates to ensure that the transmit data flow and the receive data flow are substantially independent of each other. The management module can be configured to monitor and control the first and second data transmission rates to ensure that the transmit and receive data flows are substantially independent of one of synchronous TDD backhaul links, synchronous FDD backhaul links, and combined TDD/FDD backhaul links. According to an exemplary embodiment of the second aspect, the network can comprise a mesh network, such as, for example, a wireless mesh network or the like.

According to a third aspect of the present invention, a system for managing communication of information in a network includes a plurality of network nodes. A plurality of circuit emulation data flows are established between a first network node and at least a second network node. A substantially identical data transmission rate is assigned to each circuit emulation data flow. A quantity of frames of data in each transmission is varied to modulate an amount of data transmitted in each circuit emulation data flow such that the plurality of circuit emulation data flows are substantially independent of each other. An average of the quantity of frames of data transmitted in each circuit emulation data flow is substantially equal to the data transmission rate.

According to the third aspect, the amount of data transmitted in at least one circuit emulation data flow can be modulated using a saw wave modulation. Alternatively, the amount of data transmitted in at least one circuit emulation data flow can be modulated using a Gaussian modulation. The amount of data transmitted in at least one circuit emulation data flow can be modulated using a sinusoidal, triangular, Gaussian, or other suitable type of modulation input. The system can include a management module in communication with the plurality of network nodes. The management module can be configured to monitor and control the quantity of frames of data in each transmission to ensure that the plurality of circuit emulation data flows are substantially independent of each other. According to an exemplary embodiment of the third aspect, the network can comprise a mesh network, such as, for example, a wireless mesh network or the like.

According to a fourth aspect of the present invention, a system for managing communication of information in a network includes a plurality of network nodes. A plurality of circuit emulation data flows are established between a first network node and at least a second network node. Each of a plurality of predetermined circuit emulation frame rates is assigned to each of the plurality of circuit emulation data flows. A second frame rate, different than each of the predetermined circuit emulation frame rates, is assigned to backhaul links between network nodes such that the second frame rate is substantially independent of each of the plurality of predetermined circuit emulation frame rates.

According to the fourth aspect, the second frame rate can be substantially independent of each of the plurality of predetermined circuit emulation frame rates to mitigate non-linearities in jitter variations of the plurality of circuit emulation data flows. Each of the plurality of predetermined circuit emulation frame rates can comprise a different data transmission rate such that the frequency of communicated packets is different for each circuit emulation data flow to make each of the plurality of circuit emulation data flows substantially independent of each other. The backhaul links comprise WiMax backhaul links, such as, for example, time division duplexing WiMax backhaul links. According to an exemplary embodiment of the fourth aspect, the network can comprise a mesh network, such as, for example, a wireless mesh network or the like.

According to a fifth aspect of the present invention, a system for managing information communication in a network includes a plurality of network nodes. Each network node includes a timing recovery module. The timing recovery module is configured to receive an indication of a change in a topology of the network. The timing recovery module is configured to initiate a holdover state in response to receipt of the indication. During the holdover state, the timing recovery module is configured to compensate for jitter variation associated with the change in the topology of the network.

According to the fifth aspect, the timing recovery module can be configured to compensate for jitter variation by generating a step change in relative jitter delay. The timing recovery module can be configured to adjust a standard deviation of the jitter variation in accordance with traffic loading in the network. According to an exemplary embodiment of the fifth aspect, the network can comprise a mesh network, such as, for example, a wireless mesh network or the like.

According to a sixth aspect of the present invention, a system for managing information communication in a network includes a plurality of network nodes. A plurality of circuit emulation data flows are established between a first network node and at least a second network node. Each packet communicated via the circuit emulation data flows is associated with a delay measurement. Each network node comprises a timing recovery module. The timing recovery module is configured to obtain S delay measurements. The timing recovery module is configured to select M of the S delay measurements with a lowest delay, in which S is greater than M. The timing recovery module is configured to discard M-N of the M delay measurements with the lowest delay, in which M is greater than N. The timing recovery module is configured to generate a timing control signal in accordance with a calculated average of the N delay measurements.

According to the sixth aspect, S can be substantially greater than M. The calculated average can comprise a linear average of the N delay measurements. The calculated average can comprise a weighted average of the N delay measurements. A lead packet can comprise a highest weight and each of a plurality of trailing packets comprises a successively lesser weight. The timing control signal can be configured to provide phase locking of a generated clock of the network node to a source clock. The timing recovery module can be configured to discard packets that are outside of a predetermined jitter variance of a lead packet. The timing recovery module can be configured to discard a current calculated average and maintain a previous calculated average when substantially all packets are outside of a predetermined range of delay measurement values. The timing recovery module can be configured to generate K calculated averages. The timing recovery module can be configured to apply a linear least squares to determine a slope of a line of best fit through the K calculated averages. The slope of the line can comprise an estimate of rate of change of delay. The rate of change of delay can comprise a frequency error between a generated clock of the network node and a source clock. According to an exemplary embodiment of the sixth aspect, the network can comprise a mesh network, such as, for example, a wireless mesh network or the like.

According to a seventh aspect of the present invention, a system for managing information communication in a network includes a plurality of network nodes. A plurality of circuit emulation data flows are established between a first network node and at least a second network node. Each packet communicated via the circuit emulation data flows is associated with a delay measurement. Each network node includes a timing recovery module. Each timing recovery module includes an estimation filter. The estimation filter is configured to generate an estimate of a mean packet delay for a fastest M packets arriving via the circuit emulation data flows. The timing recovery module is configured to generate a timing control signal in accordance with at least one of a mean and a variance of the estimated mean packet delay.

According to the seventh aspect, the estimation filter can comprise a Kalman filter. The variance of the estimated mean packet delay can be utilized inversely as a multiplication factor to generate an update to the estimated mean packet delay. The timing control signal can be configured to provide phase locking of a generated clock of the network node to a source clock. According to an exemplary embodiment of the seventh aspect, the network can comprise a mesh network, such as, for example, a wireless mesh network or the like.

According to an eighth aspect of the present invention, a method of managing information communication in a network includes the steps of: a.) establishing a plurality of circuit emulation data flows between a first network node and at least a second network node; and b.) assigning different data transmission rates to each circuit emulation data flow such that the frequency of communicated packets is different at least for each circuit emulation data flow used for timing recovery to make the plurality of circuit emulation data flows substantially independent of each other.

According to the eighth aspect, the method can include the step of: c.) controlling the data transmission rates assigned to each circuit emulation data flow to ensure that the plurality of circuit emulation data flows are substantially independent of each other. Step (b) can comprise the step of: b1.) assigning data transmission rates to each circuit emulation data flow to ensure that each of the plurality of circuit emulation data flows is substantially independent of one of synchronous TDD backhaul links, synchronous FDD backhaul links, and combined TDD/FDD backhaul links. According to an exemplary embodiment of the eighth aspect, the network can comprise a mesh network, such as, for example, a wireless mesh network or the like.

According to a ninth aspect of the present invention, a method of managing information communication in a network includes the steps of: a.) establishing a circuit emulation data flow between a first network node and a second network node, wherein the circuit emulation data flow comprises a transmit data flow and a receive data flow; and b.) assigning a first data transmission rate to the transmit data flow and a second data transmission rate to the receive data flow such that the transmit data flow at the first data transmission rate is substantially independent of the receive data flow at the second data transmission rate.

According to the ninth aspect, the first data transmission rate and the second data transmission rate can be substantially identical. The method can include the steps of: c.) compensating for non-linear jitter variations resulting from beating of the transmit and receive data flows; and d.) controlling the first and second data transmission rates to ensure that the transmit data flow and the receive data flow are substantially independent of each other. Step (d) can comprise the step of: d1.) controlling the first and second data transmission rates to ensure that the transmit and receive data flows are substantially independent of one of synchronous TDD backhaul links, synchronous FDD backhaul links, and combined TDD/FDD backhaul links. According to an exemplary embodiment of the ninth aspect, the network can comprise a mesh network, such as, for example, a wireless mesh network or the like.

According to a tenth aspect of the present invention, a method of managing communication of information in a network includes the steps of: a.) establishing a plurality of circuit emulation data flows between a first network node and at least a second network node, wherein a substantially identical data transmission rate is assigned to each circuit emulation data flow; and b.) varying a quantity of frames of data in each transmission to modulate an amount of data transmitted in each circuit emulation data flow such that the plurality of circuit emulation data flows are substantially independent of each other, wherein an average of the quantity of frames of data transmitted in each circuit emulation data flow is substantially equal to the data transmission rate.

According to the tenth aspect, step (b) can comprise one or more of the following steps: b1.) saw-wave modulating the amount of data transmitted in at least one circuit emulation data flow; b2.) Gaussian modulating the amount of data transmitted in at least one circuit emulation data flow; and/or b3.) sinusoidally modulating the amount of data transmitted in at least one circuit emulation data flow. The method can comprise the step of: c.) controlling the quantity of frames of data in each transmission to ensure that the plurality of circuit emulation data flows are substantially independent of each other. According to an exemplary embodiment of the tenth aspect, the network can comprise a mesh network, such as, for example, a wireless mesh network or the like.

According to an eleventh aspect of the present invention, a method of managing communication of information in a network includes the steps of: a.) establishing a plurality of circuit emulation data flows between a first network node and at least a second network node; b.) assigning each of a plurality of predetermined circuit emulation frame rates to each of the plurality of circuit emulation data flows; and c.) assigning a second frame rate, different than each of the predetermined circuit emulation frame rates, to backhaul links between network nodes such that the second frame rate is substantially independent of each of the plurality of predetermined circuit emulation frame rates.

According to the eleventh aspect, the second frame rate can be substantially independent of each of the plurality of predetermined circuit emulation frame rates to mitigate non-linearities in jitter variations of the plurality of circuit emulation data flows. Each of the plurality of predetermined circuit emulation frame rates can comprise a different data transmission rate such that the frequency of communicated packets is different for each circuit emulation data flow to make each of the plurality of circuit emulation data flows substantially independent of each other. The backhaul links can comprise WiMax backhaul links, such as, for example, time division duplexing WiMax backhaul links or the like. According to an exemplary embodiment of the second aspect, the network can comprise a mesh network, such as, for example, a wireless mesh network or the like.

According to a twelfth aspect of the present invention, a method of managing information communication in a network includes the steps of: a.) receiving an indication of a change in a topology of the network; b.) initiating a holdover state in response to receipt of the indication; and c.) during the holdover state, compensating for jitter variation associated with the change in the topology of the network.

According to the twelfth aspect, step (c) can comprise the step of: c1.) compensating for jitter variation by generating a step change in relative jitter delay. Additionally or alternatively, step (c) can comprise the step of: c1.) adjusting a standard deviation of the jitter variation in accordance with traffic loading in the network. According to an exemplary embodiment of the twelfth aspect, the network can comprise a mesh network, such as, for example, a wireless mesh network or the like.

According to a thirteenth aspect of the present invention, a method of managing information communication in a network includes the steps of: a.) establishing a plurality of circuit emulation data flows between a first network node and at least a second network node, wherein each packet communicated via the circuit emulation data flows is associated with a delay measurement; b.) obtaining S delay measurements; c.) selecting M of the S delay measurements with a lowest delay, wherein S is greater than M; d.) discarding M-N of the M delay measurements with the lowest delay, wherein M is greater than N; and e.) generating a timing control signal in accordance with a calculated average of the N delay measurements.

According to the thirteenth aspect of the present invention, S can be substantially greater than M. The calculated average can comprise a linear average of the N delay measurements. The calculated average can comprise a weighted average of the N delay measurements. A lead packet can comprise a highest weight and each of a plurality of trailing packets comprises a successively lesser weight. The timing control signal can be configured to provide phase locking of a generated clock of the network node to a source clock. The method can include the steps of: f.) discarding packets that are outside of a predetermined jitter variance of a lead packet; g.) discarding a current calculated average and maintaining a previous calculated average when substantially all packets are outside of a predetermined range of delay measurement values; h.) generating K calculated averages; and i.) applying a linear least squares to determine a slope of a line of best fit through the K calculated averages. The slope of the line can comprises an estimate of rate of change of delay, and the rate of change of delay can comprise a frequency error between a generated clock of the network node and a source clock. According to an exemplary embodiment of the thirteenth aspect, the network can comprise a mesh network, such as, for example, a wireless mesh network or the like.

According to a fourteenth aspect of the present invention, a method of managing information communication in a network includes the steps of: a.) establishing a plurality of circuit emulation data flows between a first network node and at least a second network node, wherein each packet communicated via the circuit emulation data flows is associated with a delay measurement; b.) generating an estimate of a mean packet delay for a fastest M packets arriving via the circuit emulation data flows; and c.) generating a timing control signal in accordance with at least one of a mean and a variance of the estimated mean packet delay.

According to the fourteenth aspect, step (b) can comprise the step of: b1.) performing Kalman filtering to generate the estimated mean packet delay. The variance of the estimated mean packet delay can be utilized inversely as a multiplication factor to generate an update to the estimated mean packet delay. The timing control signal can be configured to provide phase locking of a generated clock of the network node to a source clock. According to an exemplary embodiment of the fourteenth aspect, the network can comprise a mesh network, such as, for example, a wireless mesh network or the like.

According to a fifteenth aspect of the present invention, a system for managing information communication in a network includes means for establishing a plurality of circuit emulation data flows between a first network node and at least a second network node. The system includes means for assigning different data transmission rates to each circuit emulation data flow such that the frequency of communicated packets is different at least for each circuit emulation data flow used for timing recovery to make the plurality of circuit emulation data flows substantially independent of each other.

According to the fifteenth aspect, the system can include means for controlling the data transmission rates assigned to each circuit emulation data flow to ensure that the plurality of circuit emulation data flows are substantially independent of each other. The controlling means can includes means for assigning data transmission rates to each circuit emulation data flow to ensure that each of the plurality of circuit emulation data flows is substantially independent of one of synchronous TDD backhaul links, synchronous FDD backhaul links, and combined TDD/FDD backhaul links. According to an exemplary embodiment of the fifteenth aspect, the network can comprise a mesh network, such as, for example, a wireless mesh network or the like.

According to a sixteenth aspect of the present invention, a system for managing information communication in a network includes means for establishing a circuit emulation data flow between a first network node and a second network node. The circuit emulation data flow comprises a transmit data flow and a receive data flow. The system includes means for assigning a first data transmission rate to the transmit data flow and a second data transmission rate to the receive data flow such that the transmit data flow at the first data transmission rate is substantially independent of the receive data flow at the second data transmission rate.

According to the sixteenth aspect, the first data transmission rate and the second data transmission rate can be substantially identical. The system can include means for compensating for non-linear jitter variations resulting from beating of the transmit and receive data flows. The system can include means for controlling the first and second data transmission rates to ensure that the transmit data flow and the receive data flow are substantially independent of each other. The controlling means can include means for monitoring the first and second data transmission rates to ensure that the transmit and receive data flows are substantially independent of one of synchronous TDD backhaul links, synchronous FDD backhaul links, and combined TDD/FDD backhaul links. According to an exemplary embodiment of the sixteenth aspect, the network can comprise a mesh network, such as, for example, a wireless mesh network or the like.

According to a seventeenth aspect of the present invention, a system for managing communication of information in a network includes means for establishing a plurality of circuit emulation data flows between a first network node and at least a second network node. A substantially identical data transmission rate is assigned to each circuit emulation data flow. The system includes means for varying a quantity of frames of data in each transmission to modulate an amount of data transmitted in each circuit emulation data flow such that the plurality of circuit emulation data flows are substantially independent of each other. An average of the quantity of frames of data transmitted in each circuit emulation data flow is substantially equal to the data transmission rate.

According to the seventeenth aspect, the varying means can comprise means for saw-wave modulating the amount of data transmitted in at least one circuit emulation data flow. Alternatively, the varying means can comprises means for Gaussian modulating the amount of data transmitted in at least one circuit emulation data flow. The varying means can comprise means for sinusoidally modulating the amount of data transmitted in at least one circuit emulation data flow. The system can include means for controlling the quantity of frames of data in each transmission to ensure that the plurality of circuit emulation data flows are substantially independent of each other. According to an exemplary embodiment of the seventeenth aspect, the network can comprise a mesh network, such as, for example, a wireless mesh network or the like.

According to an eighteenth aspect of the present invention, a system for managing communication of information in a network includes means for establishing a plurality of circuit emulation data flows between a first network node and at least a second network node. The system includes first means for assigning each of a plurality of predetermined circuit emulation frame rates to each of the plurality of circuit emulation data flows. The system also includes second means for assigning a second frame rate, different than each of the predetermined circuit emulation frame rates, to backhaul links between network nodes such that the second frame rate is substantially independent of each of the plurality of predetermined circuit emulation frame rates.

According to the eighteenth aspect, the second frame rate can be substantially independent of each of the plurality of predetermined circuit emulation frame rates to mitigate non-linearities in jitter variations of the plurality of circuit emulation data flows. Each of the plurality of predetermined circuit emulation frame rates can comprise a different data transmission rate such that the frequency of communicated packets is different for each circuit emulation data flow to make each of the plurality of circuit emulation data flows substantially independent of each other. The backhaul links can comprise WiMax backhaul links, such as, for example, time division duplexing WiMax backhaul links or the like. According to an exemplary embodiment of the eighteenth aspect, the network can comprise a mesh network, such as, for example, a wireless mesh network or the like.

According to a nineteenth aspect of the present invention, a system for managing information communication in a network includes means for receiving an indication of a change in a topology of the network. The system includes means for initiating a holdover state in response to receipt of the indication. The system also includes means for compensating for jitter variation associated with the change in the topology of the network, during the holdover state.

According to the nineteenth aspect, the compensating means can comprise means for compensating for jitter variation by generating a step change in relative jitter delay. Additionally or alternatively, the compensating means can comprise means for adjusting a standard deviation of the jitter variation in accordance with traffic loading in the network. According to an exemplary embodiment of the nineteenth aspect, the network can comprise a mesh network, such as, for example, a wireless mesh network or the like.

According to a twentieth aspect of the present invention, a system for managing information communication in a network includes means for establishing a plurality of circuit emulation data flows between a first network node and at least a second network node. Each packet communicated via the circuit emulation data flows is associated with a delay measurement. The system includes means for obtaining S delay measurements. The system includes means for selecting M of the S delay measurements with a lowest delay, in which S is greater than M. The system includes means for discarding M-N of the M delay measurements with the lowest delay, in which M is greater than N. The system includes means for generating a timing control signal in accordance with a calculated average of the N delay measurements.

According to the twentieth aspect, S can be substantially greater than M. The calculated average can comprise a linear average of the N delay measurements. The calculated average can comprise a weighted average of the N delay measurements. A lead packet can comprise a highest weight and each of a plurality of trailing packets comprises a successively lesser weight. The timing control signal can be configured to provide phase locking of a generated clock of the network node to a source clock. The system can include means for discarding packets that are outside of a predetermined jitter variance of a lead packet. The system can include means for discarding a current calculated average and maintaining a previous calculated average when substantially all packets are outside of a predetermined range of delay measurement values. The system can include means for generating K calculated averages. The system can include means for applying a linear least squares to determine a slope of a line of best fit through the K calculated averages. The slope of the line can comprise an estimate of rate of change of delay, and the rate of change of delay can comprise a frequency error between a generated clock of the network node and a source clock. According to an exemplary embodiment of the twentieth aspect, the network can comprise a mesh network, such as, for example, a wireless mesh network or the like.

According to a twenty first aspect of the present invention, a system for managing information communication in a network includes means for establishing a plurality of circuit emulation data flows between a first network node and at least a second network node. Each packet communicated via the circuit emulation data flows is associated with a delay measurement. The system includes means for generating an estimate of a mean packet delay for a fastest M packets arriving via the circuit emulation data flows. The system includes means for generating a timing control signal in accordance with at least one of a mean and a variance of the estimated mean packet delay.

According to the twenty first aspect, the estimate generating means can comprise means for Kalman filtering configured to generate the estimated mean packet delay. The variance of the estimated mean packet delay can be utilized inversely as a multiplication factor to generate an update to the estimated mean packet delay. The timing control signal can be configured to provide phase locking of a generated clock of the network node to a source clock. According to an exemplary embodiment of the twenty first aspect, the network can comprise a mesh network, such as, for example, a wireless mesh network or the like.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for packet timing of circuit emulation services over networks capable of carrying circuit emulation traffic, such as, for example, wireless mesh networks or the like. According to exemplary embodiments, the data flows through the network are altered so as to be suitably independent of each other, and, more specifically, to ensure that the data flows required for timing purposes are suitably independent of all or substantially all other data flows. In other words, the data flows required or otherwise used for timing recovery are made to be effectively orthogonal to each other. For example, each circuit emulation data flow can be assigned independent data rates, such that the frequency of packets being transmitted is different for each of these flows. According to an alternative exemplary embodiment, instead of modulating transmission rates, the amount (e.g., number of bytes) of information that is communicated in each data flow can be modulated or otherwise varied so that the data flows are effectively orthogonal with respect to each other. Consequently, jitter delay variations avoid the interplay of packet streams that can gradually and persistently beat with each other in conventional systems. Such beating in conventional systems can result in non-linear statistics that cannot be filtered through standard Proportional-Integral-Derivative (PID) controllers or the like that are required to maintain an accurate stable clock for circuit emulation services.

Figure 1:
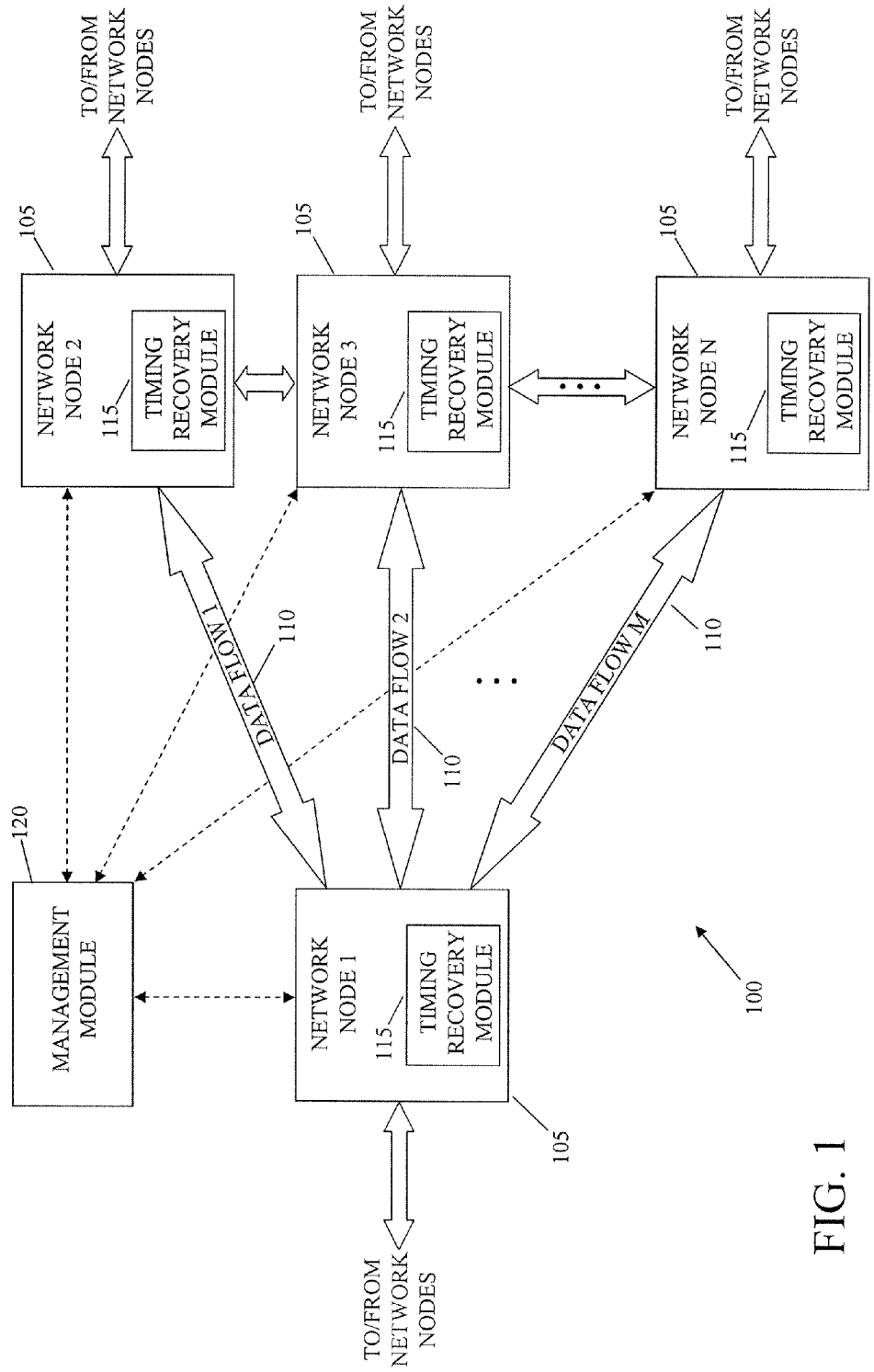
FIG. 1 is a diagram illustrating a system for managing information communication in a network, in accordance with an exemplary embodiment of the present invention.

These and other aspects and embodiments of the present invention will now be described in greater detail. FIG. 1 is a diagram illustrating a system 100 for managing information communication in a network, in accordance with an exemplary embodiment of the present invention. The system 100 includes a plurality of network nodes 105 (e.g., network node 1, network node 2, network node 3, . . . , network node N, where N can be any suitable number). The system 100 is configured to establish a plurality of circuit emulation data flows 110 (e.g., data flow 1, data flow 2, ... data flow M, where M can be any suitable number) between the first network node 105 (e.g., network node 1) and at least a second network node 105 (e.g., any, all or any combination of network nodes 2 to N). Each data flow 110 can be associated with a different circuit emulation service. According to exemplary embodiments, different data transmission rates can be assigned to each circuit emulation data flow 110 such that the frequency of communicated packets is different at least for each circuit emulation data flow required or otherwise used for timing recovery. Consequently, the plurality of circuit emulation data flows 110 can be made substantially independent or effectively orthogonal to each other. For example, each or any of the plurality of network nodes 105 can include a corresponding timing recovery module 115. The timing recovery module 115 can be configured to modulate the transmission frequency of each data flow 110 so that the data flows 110 are independent or substantially independent of each other. According to an exemplary embodiment, circuit emulation flows (e.g., T1 circuit emulation flows) that are not required or otherwise used for timing purposes can be left to beat against each other, as these circuit emulation flows may not require the more stringent timing requirements of, for example, the Global System for Mobile Communications (GSM) standard or the like.

The network can comprise any suitable type of packet-based network capable of carrying circuit emulation traffic, either wired or wirelessly. For example, the network can comprise a mesh network, such as, for example, a wireless mesh network or the like, although the network can be any suitable type of packet-based network. Merely for purposes of illustration and not limitation, a wireless mesh network or the like can be carrying six different circuit emulation data flows 110 (although the network can be carrying any suitable number of data flows 110). Each data flow 110 can be assigned different numbers or quantities of frames per packet, thereby establishing different flow or transmission rates. For example, one data flow 110 can send packets every 4 ms or 32 frames of 125 µs. A second data flow 110 can be transmitting packets every 4.125 ms or every 33 frames. A third data flow 110 can be sending packets every 4.375 ms or 35 frames. A similar allocation of transmission rates can be assigned to the remaining data flows 110 of the present illustration. Each circuit emulation data flow 110 will be effectively orthogonal to each other such that less than just 1/(33*32) or approximately 0.1% of each circuit emulation data flow pair will be correlated. The remaining 99.9% are uncorrelated. Therefore, according to exemplary embodiments, clock recovery algorithms can experience little or no beating or non-linear timing interactions of these packet data streams. It is noted that such de-correlation can be used for the circuit emulation services that are required for the purposes of timing recovery. For purposes of illustration and not limitation, where 1 of 4 circuit emulation services is used for clock recovery applications, and where the remaining 3 of 4 circuit emulation services are intended for data transmission, then such de-correlation is used to ensure that the circuit emulation service used for timing recovery is allocated a transmission rate that is effectively orthogonal to the remaining 3 circuit emulation services.

Any appropriate data transmission rates can be assigned to each of the data flows 110 using any suitable mechanism, depending on the type of network, the number of data flows 110 and other like factors, so that each of the circuit emulation data flows 110 is independent or substantially independent (e.g., effectively orthogonal) to any other data flow 110. For example, for a wireless mesh network, the assignment of transmission rates can be "hard coded" by software at the mesh radio node level (e.g., using the corresponding timing recovery modules 115 of each network node 105). According to an alternative exemplary embodiment, the system 100 can include a management module 120 in communication with each or any of the plurality of network nodes 105. The management module 120 can be configured to monitor and control the data transmission rates assigned to each circuit emulation data flow 110 to ensure that the plurality of data flows 110 is substantially independent of each other, and, more specifically, to ensure that the data flows required or otherwise used for timing purposes are substantially independent of all (or substantially all) other data flows.

According to exemplary embodiments, the management module 120 can set the system parameters of the frame rates or operation of the circuit emulation data flows 110 to ensure that all flows are independent with respect to each other and with respect to any synchronous Time Division Duplexing (TDD), Frequency Division Duplexing (FDD) or combined TDD/FDD backhaul links, as discussed below. For example, the management module 120 can use any suitable type of network management system (NMS) software or the like that can include a suitable mechanism, such as the use of a suitable type of Management Information Base (MIB) or the like, to monitor and control the various timing settings. Thus, the management module 120 can be used to assign data transmission rates at the network level as part of the NMS or other network monitoring facility. Additionally or alternatively, the data transmission rates can be assigned to each circuit emulation data flow 110 through, for example, a distributed software application that runs across the wireless mesh network. However, the assignment of data transmission rates can simply be a set of rules or guidelines that installers follow when they initialize and save the settings for the various circuit emulation data flows 110 to ensure that each one is substantially independent of the other.

Figure 4:
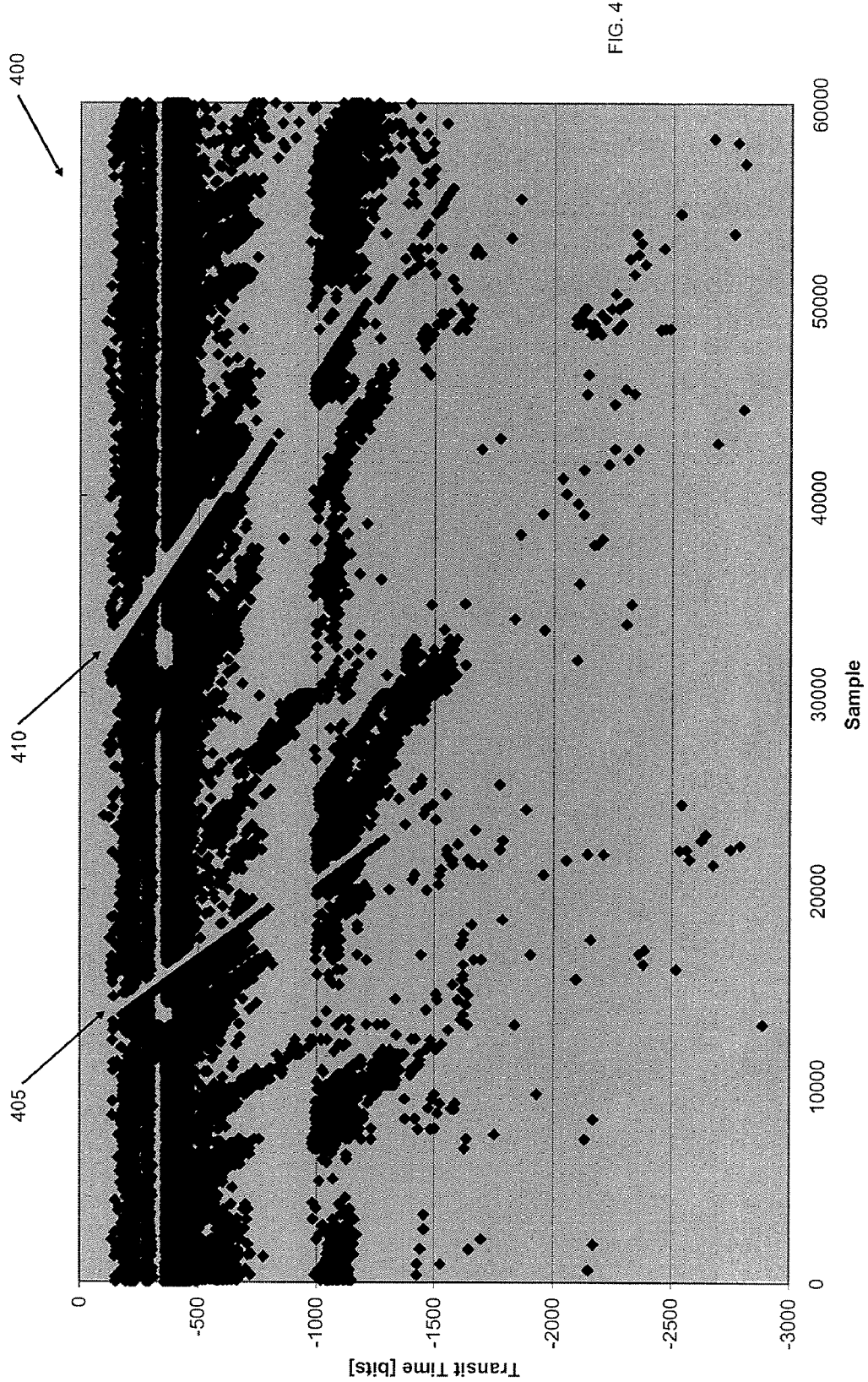
FIG. 4 is a graph illustrating the time plot of packet delay jitter for four T1 circuit emulation services, when these services are all correlated and running at 32 frames per packet or 4 ms per packet.
Figure 5:
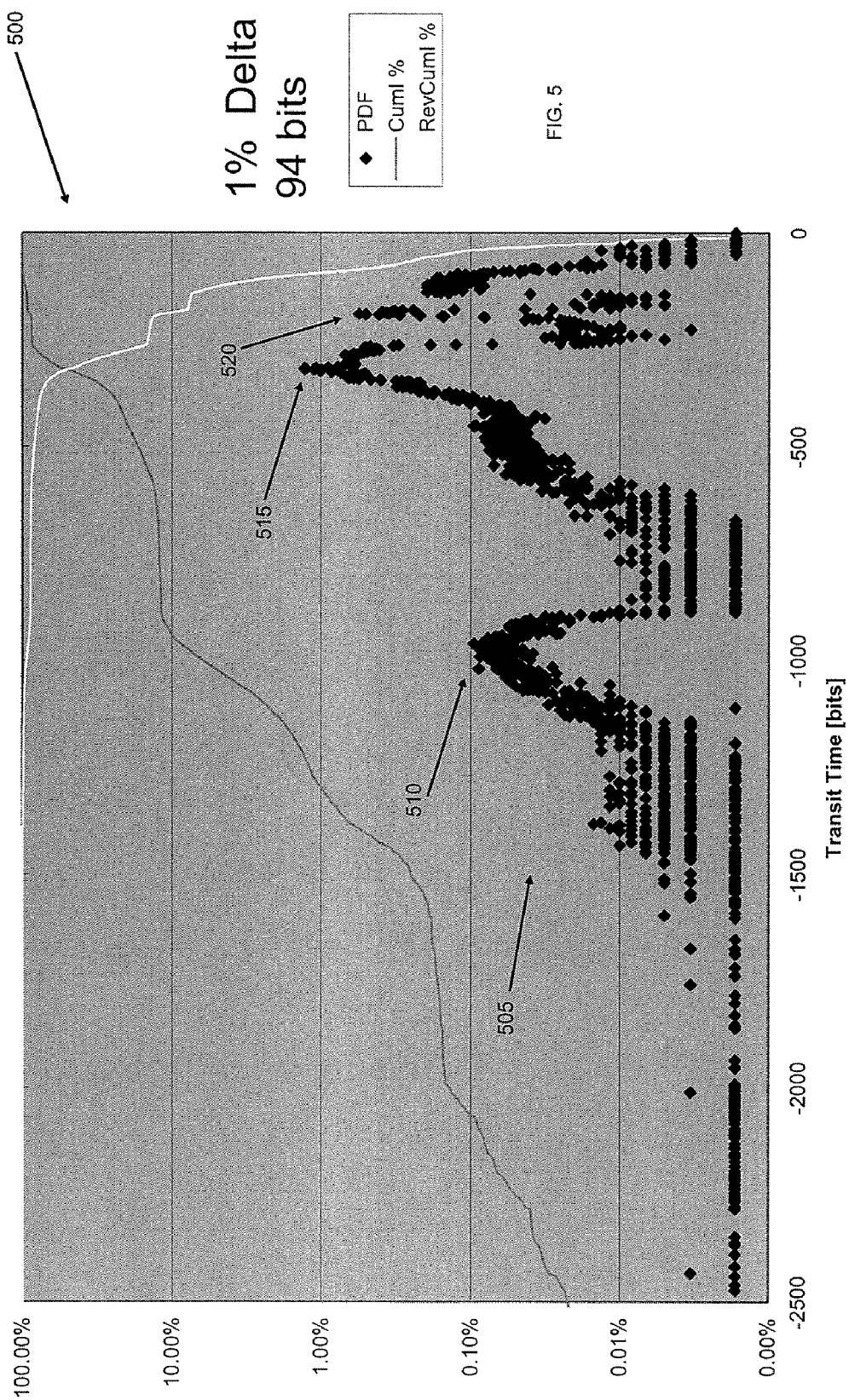
FIG. 5 is a plot illustrating the probability distribution function corresponding to the graph illustrated in FIG. 4.

Several figures can be used to illustrate the impact of making the circuit emulation streams independent or substantially independent with respect to each other, in accordance with exemplary embodiments of the present invention. Conventionally, FIG. 4 is a graph 400 illustrating the time plot of packet delay jitter for four T1 circuit emulation services, when these services are all correlated (i.e., are not independent of each other) and all running at 32 frames per packet or 4 ms per packet. In FIG. 4, visible "cuts" and "dead zones" are the result of non-linear packet-to-packet delay variations. Two of the "cuts" 405 and 410 affect the leading edge packets—those with the fastest arrival rate shown in FIG. 4 at the top of the graph. The angle and depth of these cuts 405 and 410 is affected by many parameters, such as, for example, packet size, relative clock drifts of the circuit emulation streams, backhaul throughput rate, network load of non or other circuit emulation services, operation of the actual timing recovery algorithms and other like parameters. In other runs, these patterns can change, making such non-linear behavior exceedingly difficult, if not substantially impossible, to filter out when attempting to estimate the recovered clock from the packet delay variations and packet jitter. FIG. 5 is a plot 500 illustrating the probability distribution function (PDF) 505 corresponding to the graph 400 illustrated in FIG. 4. The PDF 505 shows leading edges that demonstrate multiple "modes" or "peaks" 510, 515 and 520 resulting from the non-linear interactions of the circuit emulation data flows.

Figure 6:
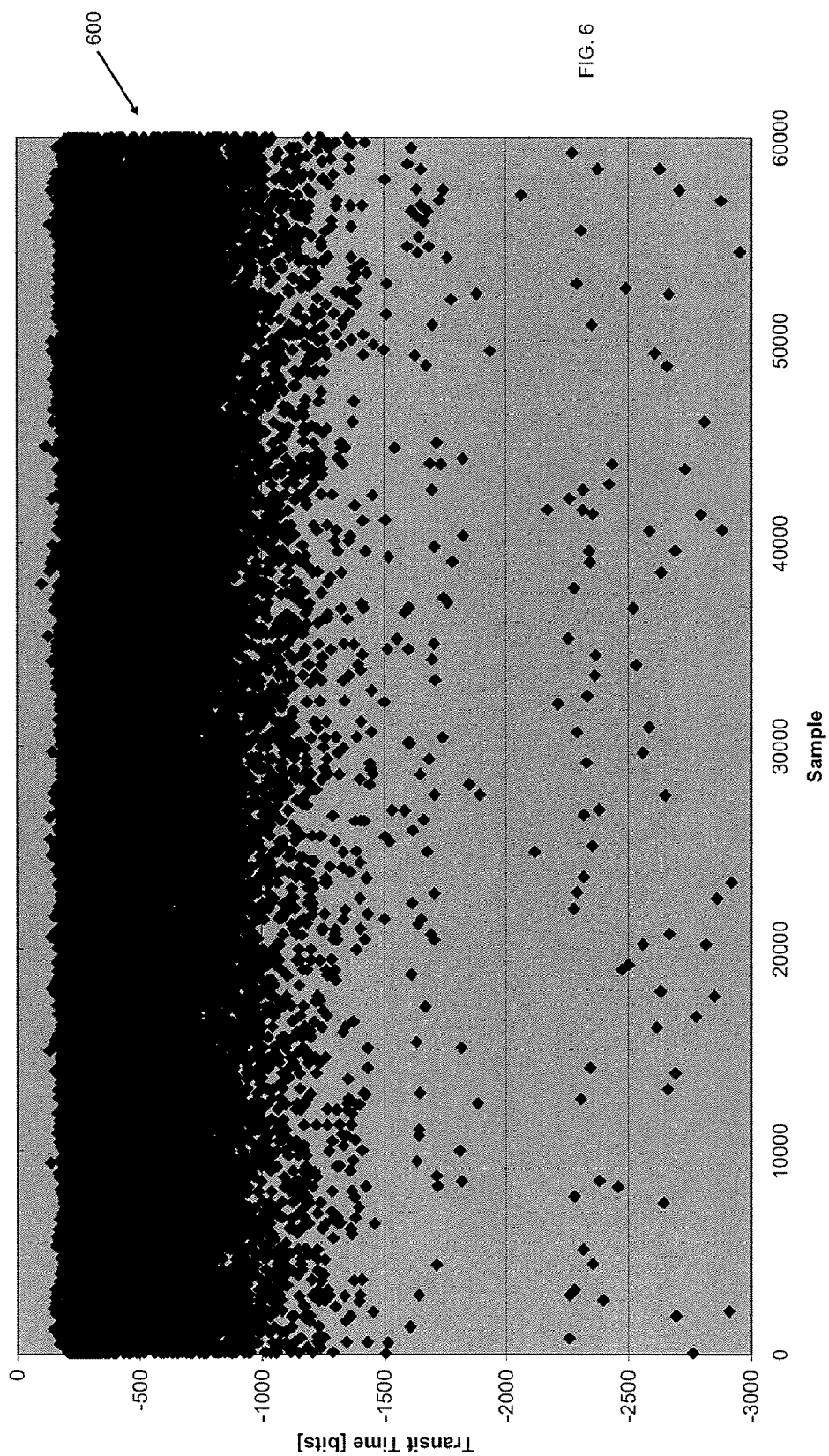
FIG. 6 is a graph illustrating the impact of making each of the circuit emulation flows of FIG. 4 independent of each other, in accordance with an exemplary embodiment of the present invention.
Figure 7:
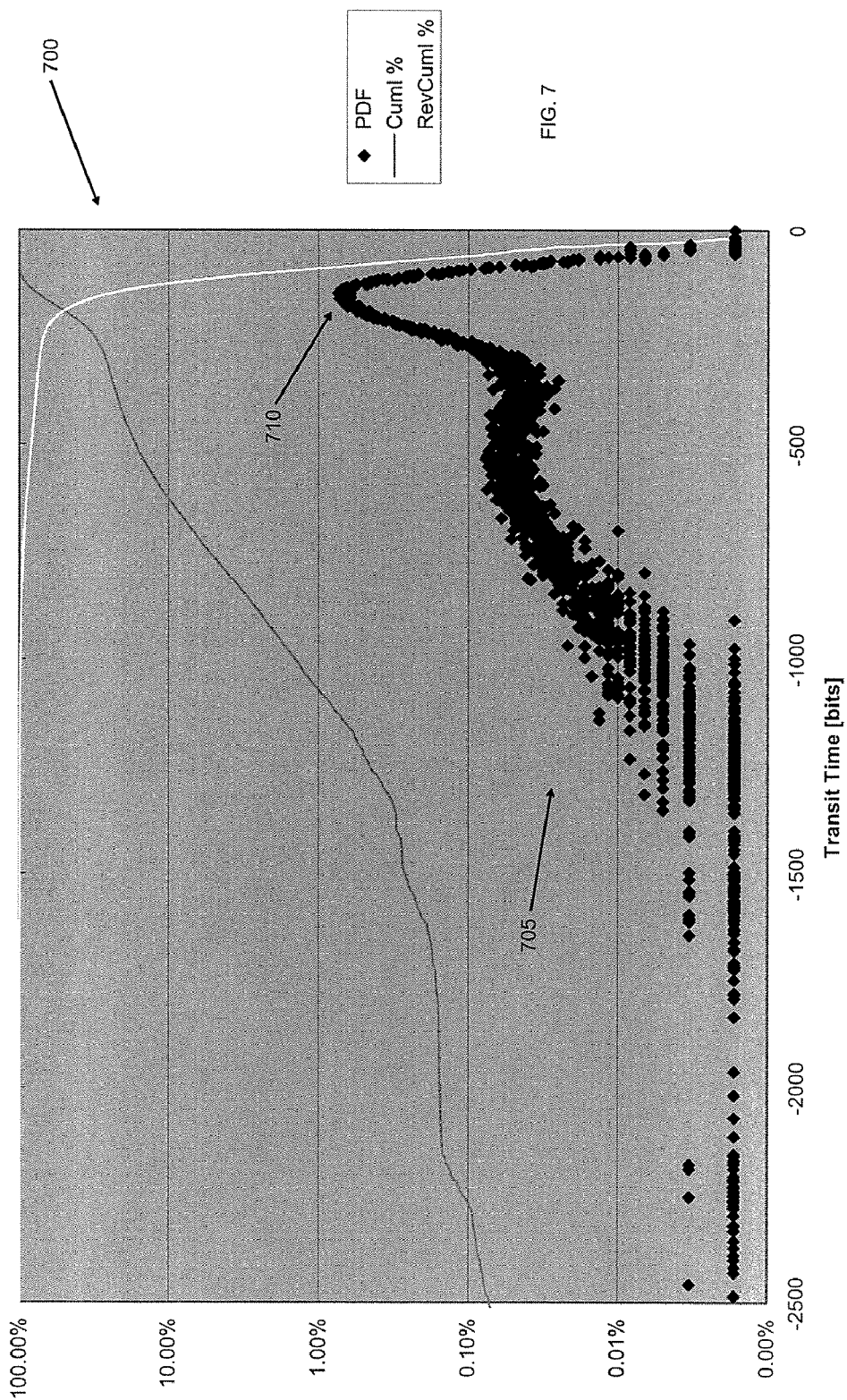
FIG. 7 is a plot illustrating the probability distribution function corresponding to the graph illustrated in FIG. 6, in accordance with an exemplary embodiment of the present invention.

In contrast, FIG. 6 is a graph 600 illustrating the impact of making each of the circuit emulation flows (of FIG. 4) independent of each other, in accordance with an exemplary embodiment of the present invention. For purposes of illustration and not limitation, rather than having all four flows at, for example, 32 frames per packet as illustrated in FIG. 4, the four T1 circuit emulation services can be set to, for example, 32, 33, 34 and 35 frames per packet or 4, 4.125, 4.25, 4.375 and 4.5 ms packet rates, respectively. As illustrated in FIG. 6, the packet jitter and packet jitter variation are both significantly improved, as the various circuit emulation data flows are now optimally flowing across the network, such as a wireless mesh network or the like, with minimal interactions. FIG. 6 also illustrates that the leading edge of the packet delay/jitter statistics is much cleaner, with no non-linear "cuts" or deviations as seen in FIG. 4. The samples of FIG. 6 are well behaved, which can allow conventional filtering algorithms to optimally estimate the earliest packet arrivals, as required for optimal timing recovery. FIG. 7 is a plot 700 illustrating the PDF 705 corresponding to the graph 600 illustrated in FIG. 6, in accordance with an exemplary embodiment of the present invention. In comparison with the PDF 505 shown in FIG. 5, it can be seen that there is just one dominant mode/peak 710 of the PDF 705 illustrated in FIG. 7, thereby demonstrating the substantial elimination of non-linear modes.

Figure 15:
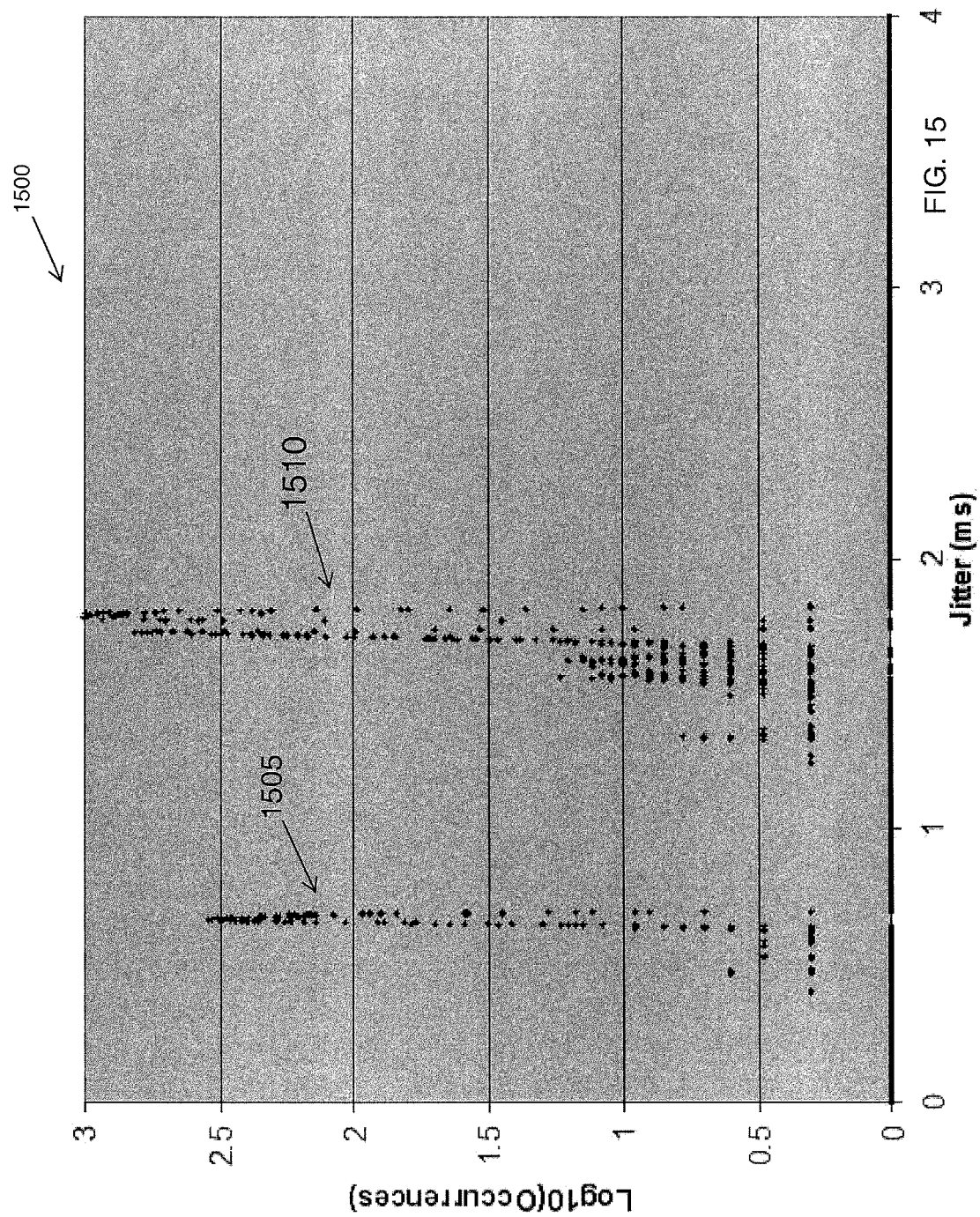
FIG. 15 is a histogram illustrating the time plot of packet delay jitter for WiMAX in the case of a 2.50 ms frame rate.

FIG. 15 is a histogram illustrating the time plot 1500 of packet delay jitter for WiMAX in the case of a 2.50 ms frame rate. In the case of the WiMAX 2.50 ms frame rate, which was collected over an interval of approximately fifteen minutes, two modes are caused by the slow drift of the T1 context flows with respect to the WiMAX frame rate, both of which are near zero parts-per-million error. However, as illustrated in FIG. 15, because of the drift of the two nearly synchronous timing sources, the fastest or leading edge packets actually experience a step change of approximately 1 ms as the WiMAX frame drifts with respect to the circuit emulation streams. Such a step change in jitter, shown as the two peaks 1505 and 1510 in FIG. 15, would cause a significant error in the recovered clock.

Figure 14:
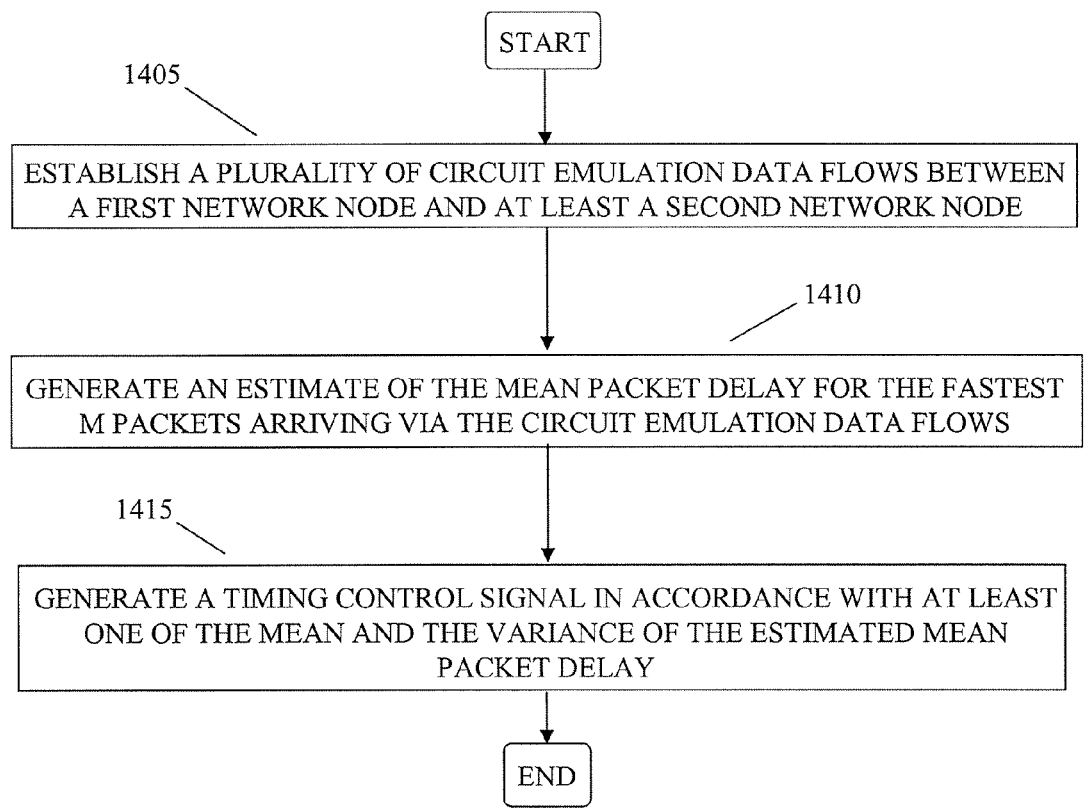
FIG. 14 is a flowchart illustrating steps for managing information communication in a network, in accordance with an alternative exemplary embodiment of the present invention.
Figure 16:
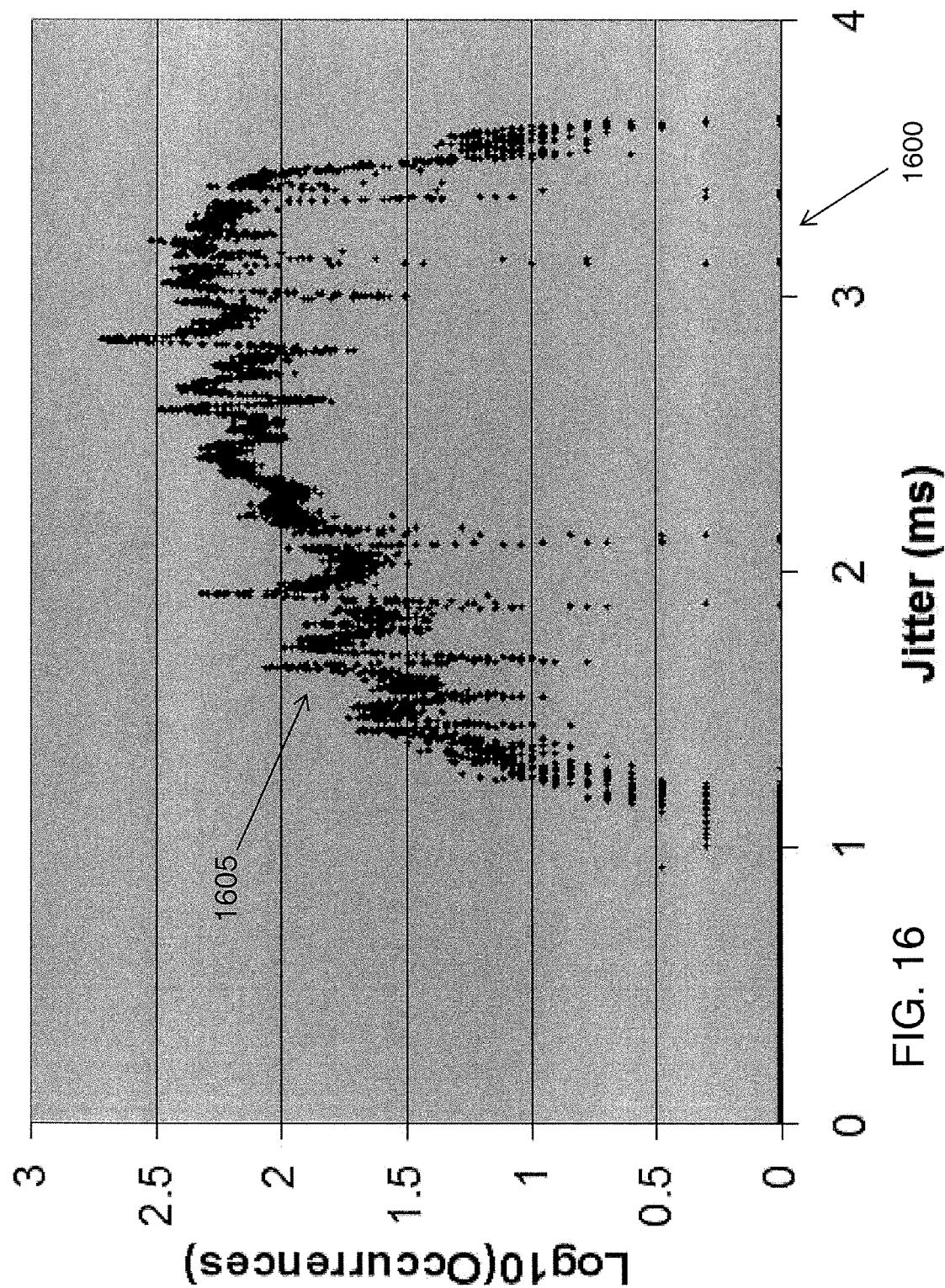
FIG. 16 is a histogram illustrating the time plot of packet delay jitter for WiMAX after making each of the circuit emulation flows of FIG. 14 orthogonal in frequency to the WiMAX frame rate of 2.510 ms, in accordance with an exemplary embodiment of the present invention.

FIG. 16 is a histogram illustrating the time plot 1600 of packet delay jitter for WiMAX after making each of the circuit emulation flows of FIG. 14 orthogonal in frequency to the WiMAX frame rate of 2.510 ms, in accordance with an exemplary embodiment of the present invention. For FIG. 16, the circuit emulation flows have been made orthogonal in frequency to the WiMAX frame rate, and form an even distribution 1605 across the 2.510 ms WiMAX frame, thereby making leading edge clock recovery free of slow breathing effects.

Figure 2:
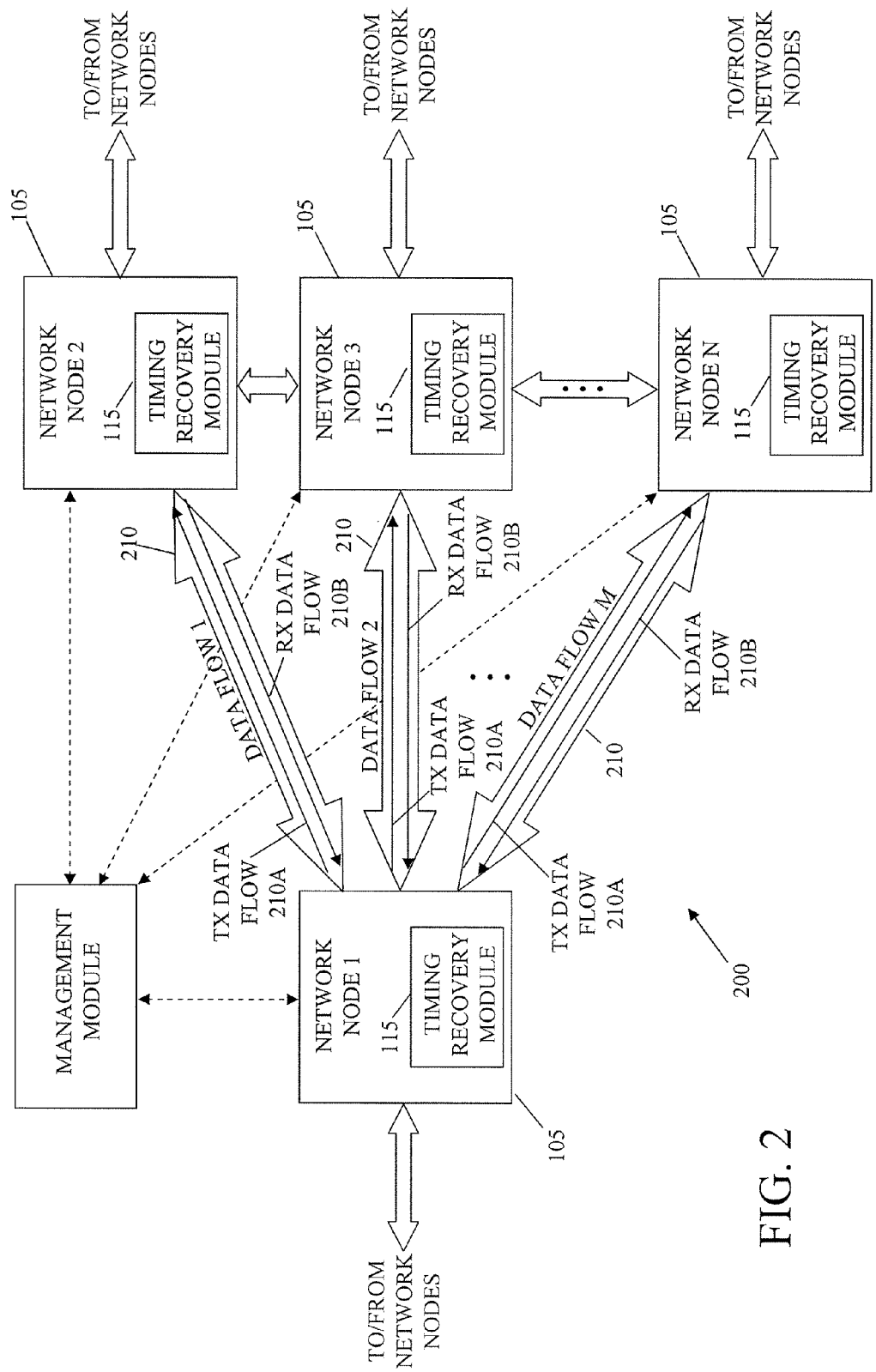
FIG. 2 is a diagram illustrating a system for managing information communication in a network, in accordance with an alternative exemplary embodiment of the present invention.

In the previous exemplary embodiment, packet flows from different circuit emulation services are made to be substantially independent of one another by assigning a different data transmission rate to each packet flow. FIG. 2 is a diagram illustrating a system 200 for managing information communication in a network, in accordance with an alternative exemplary embodiment of the present invention. As with the previous exemplary embodiment, the system 200 is configured to establish a plurality of circuit emulation data flows 210 (e.g., data flow 1, data flow 2, . . . data flow M, where M can be any suitable number) between the first network node 105 (e.g., network node 1) and at least a second network node 105 (e.g., any, all or any combination of network nodes 2 to N). However, each circuit emulation data flow 210 includes a transmit data flow 210A and a receive data flow 2101B. According to the present alternative exemplary embodiment, a first data transmission rate can be assigned to the transmit data flow 210A and a second data transmission rate can be assigned to the receive data flow 2101B in each circuit emulation data flow 210. Accordingly, the transmit data flow 210A at the first transmission rate will be substantially independent of the receive data flow 210B at the second data transmission rate. In other words, according to the present alternative exemplary embodiment, the packet flows corresponding to the transmit/receive paths or up/down streams of a single circuit emulation service can be made to be independent, since these packet flows traverse a common wireless mesh infrastructure, and, therefore, can experience similar interplay issues as with the different circuit emulation services discussed previously.

According to the present exemplary embodiment, the first and second data transmission rates assigned to the transmit and receive data flows 210A and 2101B, respectively, are different data transmission rates. However, according to an alternative exemplary embodiment, the first and second data transmission rates can be substantially identical. If the first and second data transmission rates are substantially identical, then one or more of the timing recovery modules 115 of the network nodes 105 can be configured to compensate for non-linear jitter variations resulting from beating of the transmit and receive data flows 210A and 210B. In other words, if the packet flows corresponding to the transmit/receive paths or up/down streams of a single circuit emulation service are assigned the same rate, then a suitable mechanism in the timing recovery module 115 can be used to detect, holdover, and compensate for the non-linear jitter variations resulting from the beating of these two packet flows. For example, the timing recovery module 115 can be configured to detect jitter variations (e.g., outside a predetermined threshold). Once detected, the timing recovery module 115 can initiate a holdover state. During the holdover state, the timing recovery module 115 can be configured to compensate for the jitter variation in an appropriate manner.

In the previous exemplary embodiments, packet flows from different circuit emulation services or transmit and receive data flows within a circuit emulation service are made to be substantially independent by assigning a different data transmission rate to each packet flow. According to an alternative exemplary embodiment, a substantially identical data transmission rate can be assigned to each circuit emulation data flow 110. However, instead of modulating the data transmission rate of each data flow 110, the number or quantity of bytes transmitted in each data flow 110 can be modulated. For purposes of illustration and not limitation, assume that all circuit emulation data flows 110 are transmitted at the same base rate, such as, for example, 32 frames per packet or the like, resulting in one packet every 4 ms. However, such a base rate represents the average number of frames or data bytes carried, while the instantaneous number of frames or data bytes is adjusted to result in, effectively, a modulation in the number or quantity of transmitted bytes. For example, a slow ramp (e.g., saw wave modulation) can be used to modulate the amount of data transmitted in a first data flow 110, where the frames can be sent with, for example, 30, 31, 32, 33, 34, 30, 31, 32, 33, 34, . . . frames per packet, resulting in an average rate of 32 frames per packet. A second data flow 110 can use a different modulation, such as, for example, 30, 30, 31, 31, 32, 32, 33, 33, 34, 34, . . . , again achieving an average transmission rate of 32 frames per packet. A third data flow 110 can rely on a Pseudo Random Binary Noise Sequence (PRBNS) or the like to derive a random-like Gaussian statistic to the number of transmitted bytes, and, therefore, the rate of transmission of circuit emulation packets through the network. Various appropriate methods of modulating the number or quantity of transmitted frames can be used, such as, for example, a sinusoidal signal can be used to modulate the number of transmitted bytes. Alternatively, pseudo random binary number sequences can be used to generate a Gaussian modulation, although other suitable types of modulation input (e.g., saw-wave, triangular, or the like) can be used. The modulation of the number or quantity of bytes transmitted can cause the packet flows to be independent with respect to each other, thereby mitigating the non-linear jitter variations to within acceptable limits for timing recovery.

Thus, according to the present alternative exemplary embodiment and as illustrated in FIG. 1, the plurality of circuit emulation data flows 110 can be established between the first network node 105 and at least a second network node 105. A substantially identical data transmission rate can be assigned to each circuit emulation data flow 110. The number or quantity of frames of data in each transmission can be varied to modulate the amount of data transmitted in each circuit emulation data flow 110 such that the plurality of circuit emulation data flows 110 are substantially independent of each other. The average of the number or quantity of frames of data transmitted in each circuit emulation data flow 110 is substantially equal to the given data transmission rate.

An additional exemplary embodiment of the present invention can be used for synchronous backhaul links, which can be, for example, TDD, FDD or the like. Such backhaul links can force fixed frame sizes or frame rates, for example, for mesh-node-to-mesh-node connections. According to such an exemplary embodiment, the backhaul link frame rates can be made to be independent of the frame rate of the various circuit emulation streams. In particular, each of a plurality of predetermined circuit emulation frame rates can be assigned to each of the plurality of circuit emulation data flows 110. A second frame rate, different than each of the predetermined circuit emulation frame rates, can be assigned to the backhaul links between network nodes 105 such that the second frame rate is substantially independent of each of the plurality of predetermined circuit emulation frame rates.

The backhaul links can comprise any suitable type of backhaul link for communicating appropriate information between network nodes 105. For example, the backhaul links can comprises WiMax backhaul links or the like. For purposes of illustration not limitation, for a TDD WiMax backhaul system, the WiMAX frame rate can be selected to be a non-125 µs frame rate, such as, for example, 2.333 ms frames. Such a frame rate can be independent of the frame rates of the circuit emulation data flows 110, and, therefore, does not introduce nonlinearities in the jitter variations of the circuit emulation data flows 110. In contrast, if the WiMAX frame rates are set to, for example, 4 ms and the circuit emulation data flows 110 are also set to 4 ms, the jitter variation can display highly non-linear statistics that can make it difficult to recover timing from the circuit emulation streams. However, according to exemplary embodiments, the WiMAX frame rate can be set to a multiple of, for example, 125 µs, as specified in the WiMAX standard. The circuit emulation data flows 110 are configured to not use the same frame rate, for example, either through a mechanism in the network node 105 software (e.g., using timing recovery module 115), network management software (e.g., using management module 120), an installer following instructions in the user guides or the like. For example, the WiMAX frame rate can be set to 2.5 ms, and the circuit emulation data flows 110 can be set to 2.75 ms, 3.0 ms, and 3.125 ms packet rates. Other frame rates can be used for the WiMax frame rate and the frames rates of the circuit emulation data flows 110, so long as the frame rate of the backhaul link is different than the frame rates of the circuit emulation data flows 110. For example, to maintain a near standard WiMAX frame rate, a 10 µs offset can be employed to result in substantially changing the frequency of the WiMAX frame rate. The new frame rate would be 2.51 ms rather than the 2.5 ms frame rate defined in the standard. It is noted that WiMAX uses multiples of 125 µs for its frame rates, with the following defined rates: 2.5 ms; 4 ms; 5 ms; 8 ms; 10 ms; 12.5 ms and 20 ms.

In a network configuration such as, for example, a wireless mesh, multiple redundant paths are often employed to improve network resiliency to failures. Such failures can be caused by, for example, interference to the radio link between mesh nodes, localized power failures affecting one or more mesh nodes, software or hardware failures affecting service, and the like. Wireless mesh systems use, for example, Rapid Spanning Tree Protocol (RSTP), Spanning Tree Protocol (STP), Multiple Spanning Tree Protocol (MSTP), Open Shortest Path First (OSPF) or other layer 2, layer 3 or even higher layer or proprietary "mesh resiliency protocols" to reconfigure the mesh topology of the network to re-establish services. Such reconfigurations can result in non-linear jitter variations that must be addressed by the timing recovery software.

According to an additional exemplary embodiment of the present invention, the timing recovery modules 115 of the network nodes 105 can be configured to receive an indication of a change in the topology of the network. The indication can be generated by, for example, mesh resiliency protocols or the like when a reconfiguration of the topology of the network takes place in response to one or more failures. The timing recovery modules 115 can be configured to initiate a holdover state in response to receipt of the indication. During the holdover state, the timing recovery modules 115 can be configured to compensate for jitter variations associated with the change in the topology of the network, for example, by adjusting to the new jitter variation statistics seen by the new network topology. The adjustment can be performed in any suitable manner. For example, the timing recovery modules 115 can be configured to compensate for jitter variation by generating a step change in relative jitter delay, which can be either positive or negative. Additionally, the timing recovery modules 115 can be configured to adjust the standard deviation of the jitter variations, as the new network topology can have either increased or decreased traffic loading. In general, increased traffic loading can increase the jitter variance, and decreased loading can result in lower jitter variances.

As discussed previously, the packet delays and packet delay variation or packet jitter variation can be excessive in a network, such as a wireless network or the like, with shared "resources," such as TDD backhaul links where both upstream and downstream traffic contend over a common resource. In the case of excessive traffic on the backhaul links, the packet delay variation can be excessive, amounting to as much as tens of milliseconds for occasional packets delayed by retransmissions. With circuit emulation services that are used for data transport only and timing is not an issue, a control algorithm based on estimates of the mean packet delay is an acceptable and common practice within the industry. Such algorithms are accurate in their ability to track, for example, T1 timing, because such algorithms are subject to network load changes that result in an increase in the mean delay in packet arrivals. A common statistic that does not substantially change with network load is the delay statistics of the earliest packet arrivals. Such a statistic remains substantially constant regardless of the network traffic load, given a sufficiently large set of collected data samples. Several additional exemplary embodiments of the present invention can be used to provide appropriate statistical input into the timing algorithm used by, for example, the timing recovery modules 115.

As used herein, "earliest packet arrivals" refers to packets that experienced the least interference and delay in transit, which are, therefore, least sensitive to variations in interference and delay in the network. In other words, these packets are the ones that experience the least delay in transmission time through the network, such as a wireless mesh network or the like. In general, the fastest packets represent the (rare) cases of packets that experience minimal latency caused by network queuing with other packets or waiting for transmit windows in the case of synchronous TDD framing delays, contention of radio and other resources, radio retransmissions due to interference, radio link rates (note that the modulation rate can change on a packet-by-packet basis and lower modulation rates result in longer transmission delays), and the like. The fastest packets are generally measured from sets of packets, for example, the fastest M packets out of 1000 packets representing 4 seconds of packet latency/jitter measured assuming a circuit emulation packet flow rate of 4 ms or 250 packets per second. Such information requires that the statistics be collected over extended periods of time orders of magnitude greater than the packet arrival rate (e.g., data collected over 4 seconds verses 4 ms.).

For example, a selection of the fastest N of M packets can be used, with the ability to discard packets that fall outside of an allowed jitter variance of the lead packet. In such an embodiment, the control parameters passed to the timing control loop of the timing recovery module 115 can represent either a linear or weighted average of N delay measurements, where the lead packet has the highest weight and the trailing packets have progressively less weight. In the case where all packets fall outside of the expected measurement, the measurement can be discarded and the timing information can be maintained in holdover without change. Such a delay measurement can be used as input into, for example, a PID control algorithm that provides phase locking of the regenerated clock to the source clock.

To determine the average or mean arrival rate of packets, an adaptive clock recovery technique can be used. Such a technique can infer the clock rate of the original (e.g., Time Division Multiplexing (TDM)) service clock from the mean arrival rate of packets at the point where the packets leave the packet-switched network. The disadvantage of this type of scheme is that, depending on the characteristics of the packet network, it can be prove difficult to regenerate a clock that stays within the wander requirements of the plesiochronous digital hierarchy (specifically, Maximum Time Interval Error (MTIE)). The reason for this is that any variation in delay between packets can feed through as a variation in the frequency of the recovered clock. High frequency jitter can be filtered out, but any low frequency variation or wander is more difficult to remove without a (potentially very) long term time constant. This will, in turn, affect the ability of the system to lock to the original clock within an acceptable time. With no Primary Reference Source (PRS) clock, the information available to determine the TDM transmission speed is the average arrival rate of the packets. Timestamps representing the number of elapsed source clock periods can be included in the packet header, or information can be inferred from a known payload size at the destination. Average buffer-fill levels can be maintained at the destination, where an increase or decrease in the fill level of the buffer can require a change in transmission clock speed to maintain the average. Additionally, the buffer-fill depth can be altered independently, with substantially no relation to the recovered clock frequency, to control TDM transmission latency.

According to an additional exemplary embodiment of the present invention, the timing recovery module 115 is configured to obtain a set of S delay measurements of arriving packets, where S can be any suitable number. The timing recovery module 115 is also configured to select the M samples of the S delay measurements with the lowest delay, where M can be any suitable number, and S is greater than M (e.g., S can be much greater than M). Of the selected M delay measurements, the timing recovery module 115 is further configured to discard the M-N samples with the lowest delay, where N can be any suitable number, and M is greater than N. The timing recovery module 115 is then configured to generate a timing control signal by calculating an average of the remaining N delay measurements. The calculated average can comprise a linear average of the N delay measurements. Alternatively, the calculated average can comprise a weighted average of the N delay measurements. For such a weighted average, the lead packet can be given the highest weight, while each of the trailing packets can be given successively lesser weights. In calculating the weighted average, the timing recovery module 115 can discard packets that are outside of a predetermined jitter variance of the lead packet. Additionally or alternatively, the timing recovery module 115 can discard the current calculated average and maintain the previously-calculated average in holdover without change when all or substantially all of the packets fall outside of a predetermined range of delay measurement values. The resulting timing control signal can be filtered and fed into a suitable timing control loop. The timing control signal is configured to provide phase locking of the regenerated clock of the destination network node 105 to the source clock of the originating network node 105.

By selecting M of S delay measurements, the bulk of the samples are discarded that have been subjected to large, variable delay in the network. Such samples are not useful, because of the degree of variance over time (low stability). By discarding the M-N lowest delay samples of the selected M delay measurements, extremely low delays are excluded that occur with low probability. If the lowest delay measurements were included in the average on their (rare) occurrence, such measurements would cause the average to be pulled low and induce jitter in the regenerated clock. Such an exemplary approach ensures the samples represents substantially common and stable sample values. For purposes of illustration and not limitation, assume S=1000, M=10, N=1, although any suitable values can be used for S, M and N. Consequently, according to the present illustration, 99% (high delay packets) and 0.1% (unusually low delay packets) are discarded. The control signal is derived from the 0.9% of packets corresponding to the 1% to 0.1% range of the delay PDF. Conventional techniques either use all of the packets (having the drawback of poor stability) or only the (rare) extremely low delay packets (exhibiting a slow, and indeterminate, rate of clock correction due to the scarcity of useful samples). The present additional exemplary embodiment can avoid any such drawbacks.

According to a further exemplary embodiment, a least squares line fit can be applied to the packet delay measurements for the fastest M packets. In particular, the timing recovery module 115 can be configured to generate K calculated averages, where K can be any suitable number. In other words, K sets of "N of M" averages can be obtained by the timing recovery module 115. The timing recovery module 115 can be configured to use a linear least squares algorithm or other suitable algorithm to determine the slope of the line of best fit through the K calculated averages. The slope of the line represents an estimate of the rate of change of delay. The rate of change of delay comprises the frequency error between the regenerated clock of the destination network node 105 and the source clock of the originating network node 105. Such a curve fit optimally estimates the leading edge of the PDF of the accumulated packet delays, and such an estimated leading edge can be used as a phase input for the clock control algorithm when applying timing recovery of the circuit emulation clock.

Figure 3:
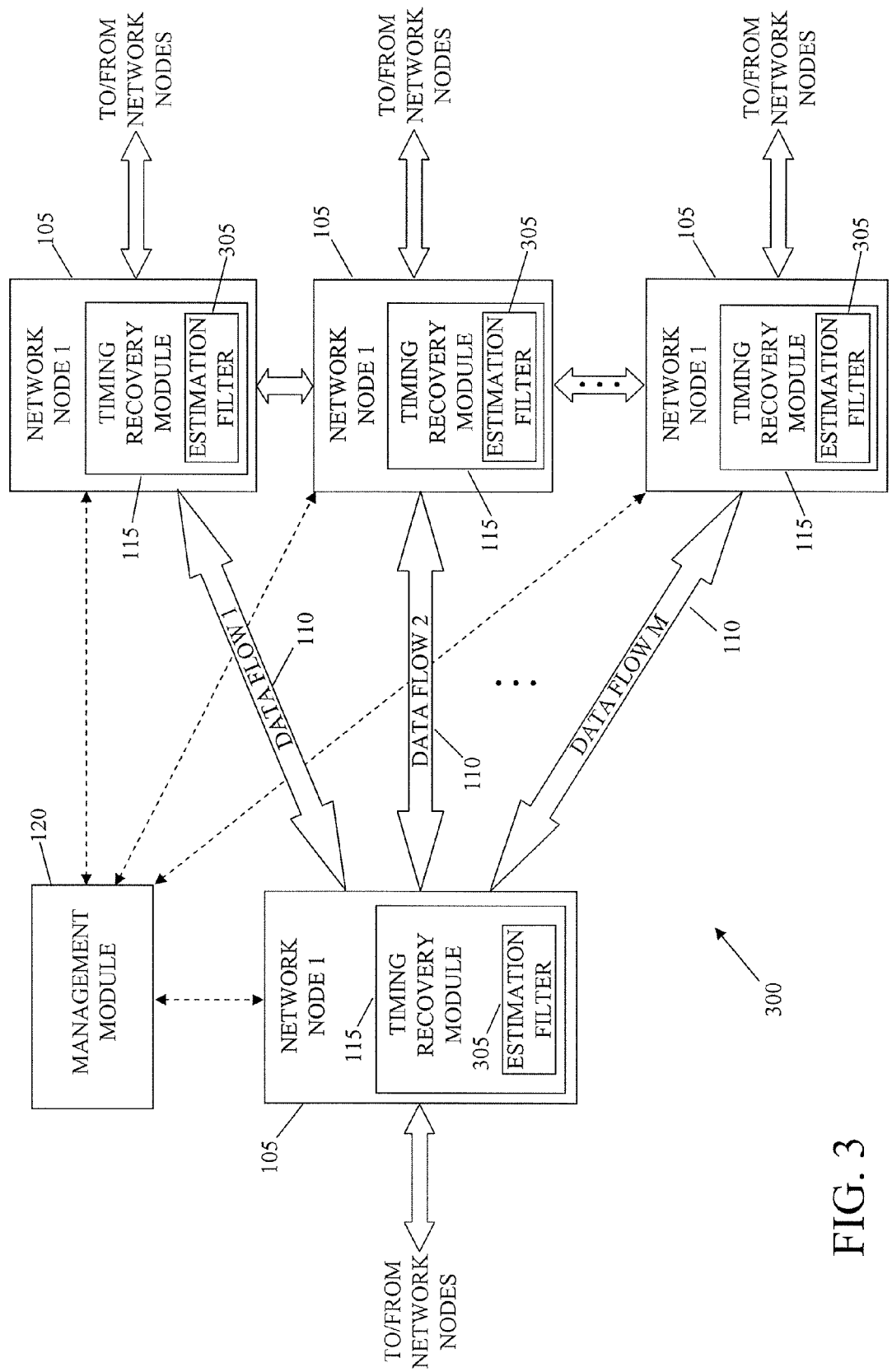
FIG. 3 is a diagram illustrating a system for managing information communication in a network, in accordance with an alternative exemplary embodiment of the present invention.

FIG. 3 is a diagram illustrating a system for managing information communication in a network, in accordance with an alternative exemplary embodiment of the present invention. As illustrated in FIG. 3, each timing recovery module 115 can include an estimation filter 305. The estimation filter 305 can be configured to generate an estimate of the mean packet delay for the fastest M packets arriving via the circuit emulation data flows 110. For example, both the mean and variance of the mean packet delay can be used to optimally set the timing of the circuit emulation data flows 110. In other words, the timing recovery module 115 can generate a timing control signal in accordance with the mean and/or variance of the estimated mean packet delay. For example, the statistical variance of the packet delay can be inversely used as a multiplication factor to establish the update to the estimated delay measurement that is used to phase lock the regenerated clock to the source clock. Any suitable estimation filter 305 can be used, such as, for example, a Kalman filter or the like.

The network nodes 105 can be configured to communicate information in any suitable type of packet-based network capable of carrying circuit emulation traffic, either wireless or wired, such as, for example, a wireless mesh network or the like, using any suitable wireless or wired communication protocol or standard. For example, the systems 100, 200 and 300 and, in particular, timing recovery modules 115 can be compatible with any suitable communication standard including, but not limited to, I.E.E.E. 802.11, 802.11a, 802.11b, 802.11g, 802.11n, 802.11s, 802.16 and 802.20, or any other suitable wireless or wired standard. For example, exemplary embodiments can also be used in any suitable type of wired network in which packet jitter can pose difficulties and, therefore, timing recovery is necessary.

Those of ordinary skilled will recognize that the network nodes 105 and, in particular, the timing recovery modules 115 can be used with any additional and/or alternative electrical or electronic components, devices or elements that can be used in or in conjunction with any suitable type of transmitter, receiver, transceiver, or communication circuit/device for communicating information signals, including additional and/or alternative mixers, local oscillators, demodulators, modulators, phase locked loops, additional and/or alternative power and low-noise amplifiers, power supplies, filters, analog-to-digital converters, digital-to-analog converters, or any other appropriate components, devices or elements in any suitable combination that can be used for communicating information signals, depending upon the nature and type of network and information signals to be communicated, the communication medium, the environment in which the network nodes 105 are to be used, and other like factors.

The network nodes 105, timing recovery modules 115 and estimation filters 305 can each be implemented using any suitable type of electrical or electronic device or circuit capable of performing the functions associated with the respective element. Accordingly, each component or device can be in communication with another component or device using any appropriate type of electrical connection that is capable of carrying electrical information. For example, the timing recovery modules 115 can be implemented using, for example, any suitable type of processor (e.g., any suitable type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like), and any suitable type of computer-readable memory or storage device (e.g., any suitable type of random access memory (RAM), read-only memory (ROM) or other suitable computer-readable medium). As will be appreciated based on the foregoing description, the memory can be programmed using conventional techniques known to those having ordinary skill in the art of computer programming. For example, the actual source code or object code of the computer program can be stored in the memory. Additionally, the processor (in conjunction with the memory) can be used, for example, to perform additional processing on communicated signals, for performing pre- or post-processing on communicated signals, and the like that are necessary for performing timing recovery.

Figure 8:
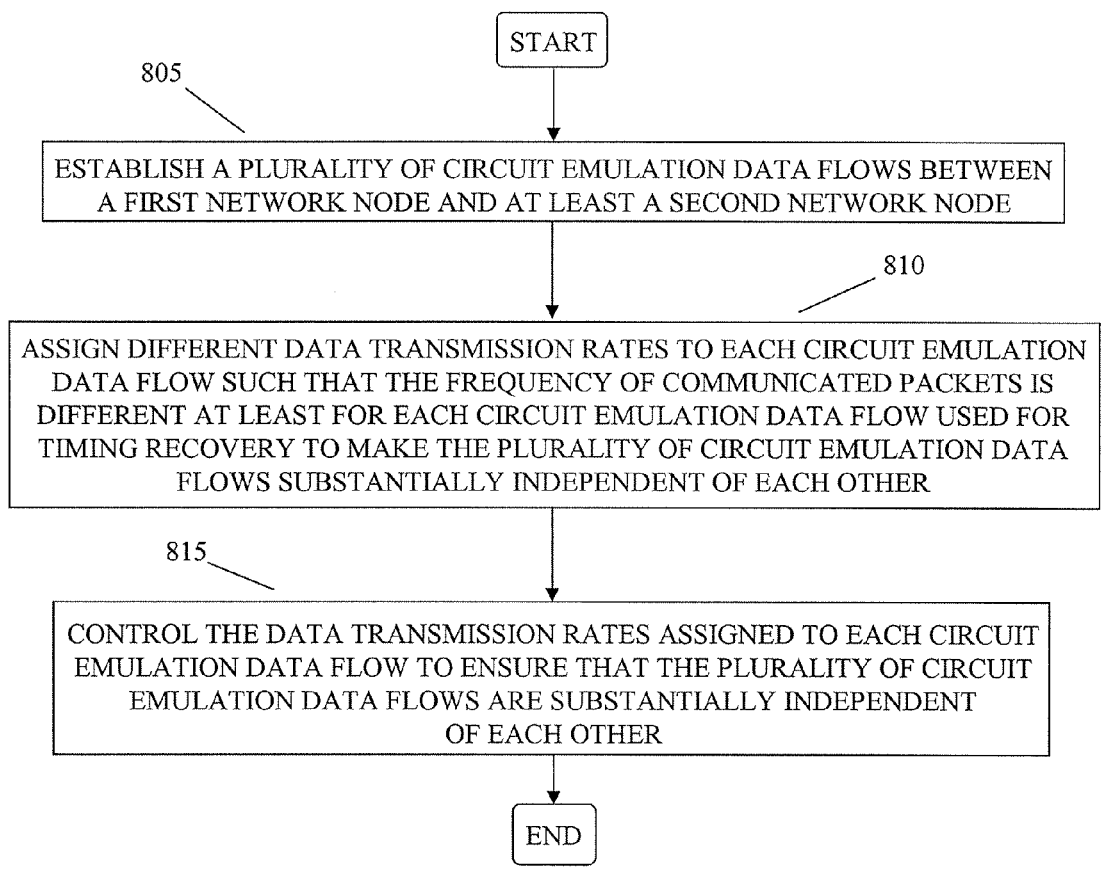
FIG. 8 is a flowchart illustrating steps for managing information communication in a network, in accordance with an exemplary embodiment of the present invention.

FIG. 8 is a flowchart illustrating steps for managing information communication in a network, in accordance with an exemplary embodiment of the present invention. In step 805, a plurality of circuit emulation data flows can be established between a first network node and at least a second network node. In step 810, different data transmission rates can be assigned to each circuit emulation data flow such that the frequency of communicated packets is different at least for each circuit emulation data flow used for timing recovery to make the plurality of circuit emulation data flows substantially independent of each other. According to an exemplary embodiment, data transmission rates can be assigned to each circuit emulation data flow to ensure that each of the plurality of circuit emulation data flows is substantially independent of one of synchronous TDD backhaul links, synchronous FDD backhaul links, and combined TDD/FDD backhaul links. In step 815, the data transmission rates assigned to each circuit emulation data flow can be suitably controlled to ensure that the plurality of circuit emulation data flows are substantially independent of each other.

Figure 9:
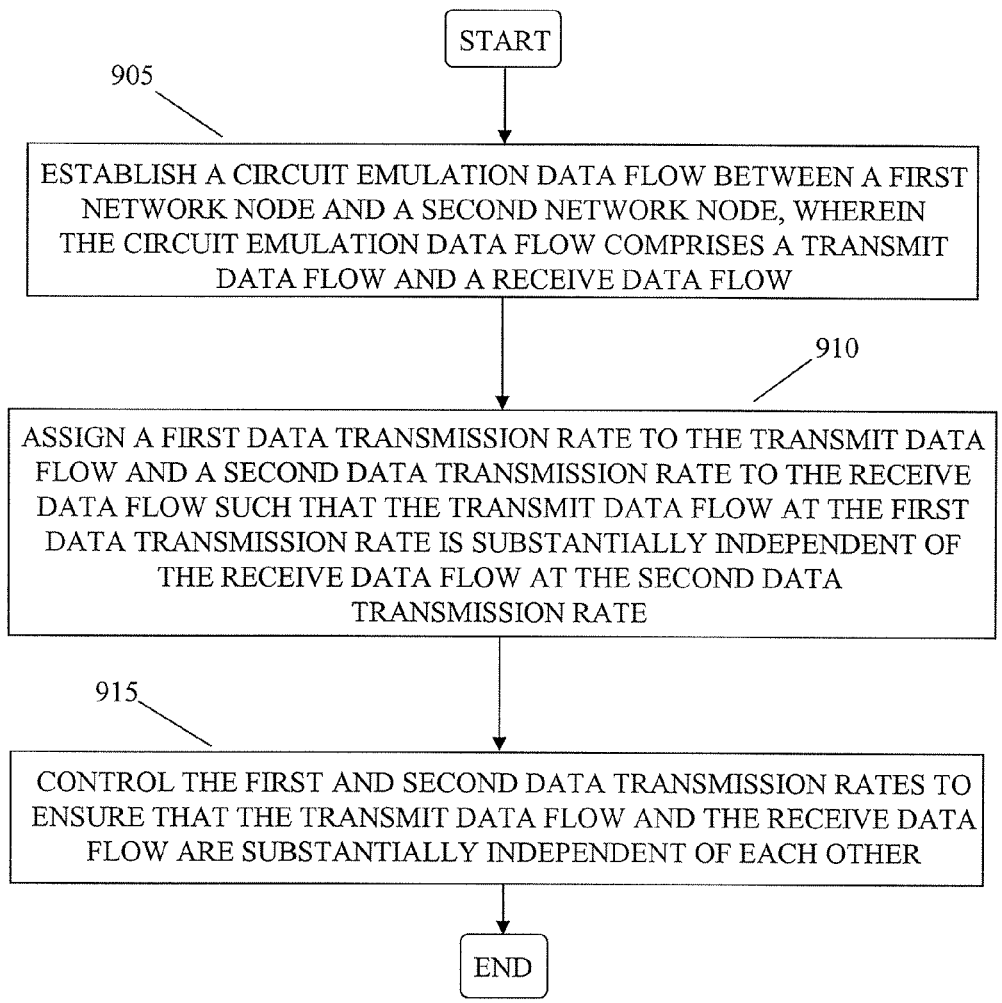
FIG. 9 is a flowchart illustrating steps for managing information communication in a network, in accordance with an alternative exemplary embodiment of the present invention.

FIG. 9 is a flowchart illustrating steps for managing information communication in a network, in accordance with an alternative exemplary embodiment of the present invention. In step 905, a circuit emulation data flow can be established between a first network node and a second network node. The circuit emulation data flow can comprise a transmit data flow and a receive data flow. In step 910, a first data transmission rate can be assigned to the transmit data flow and a second data transmission rate can be assigned to the receive data flow such that the transmit data flow at the first data transmission rate is substantially independent of the receive data flow at the second data transmission rate. In step 915, the first and second data transmission rates can be suitably controlled to ensure that the transmit data flow and the receive data flow are substantially independent of each other. For example, the first and second data transmission rates can be controlled to ensure that the transmit and receive data flows are substantially independent of one of synchronous TDD backhaul links, synchronous FDD backhaul links, and combined TDD/FDD backhaul links. According to an exemplary embodiment, the first data transmission rate and the second data transmission rate can be substantially identical. If substantially identical, then the method can include the optional step of compensating for non-linear jitter variations resulting from beating of the transmit and receive data flows.

Figure 10:
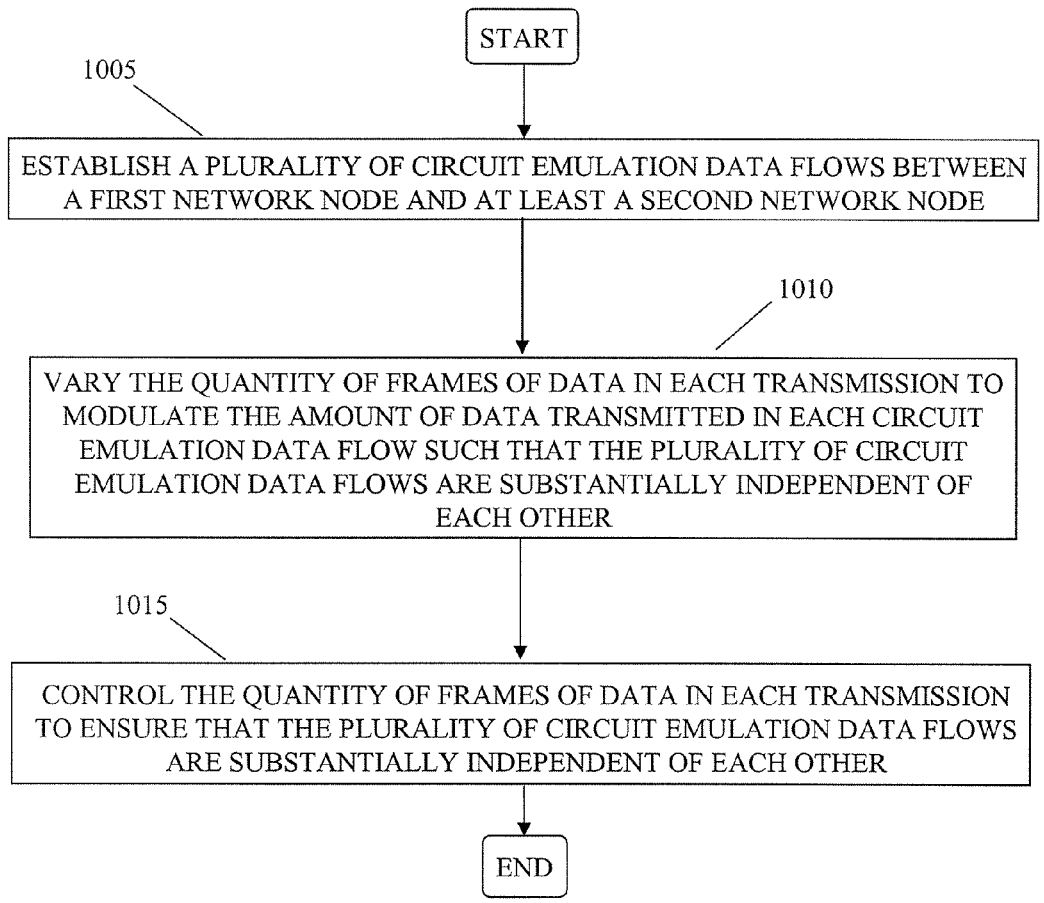
FIG. 10 is a flowchart illustrating steps for managing information communication in a network, in accordance with an alternative exemplary embodiment of the present invention.

FIG. 10 is a flowchart illustrating steps for managing information communication in a network, in accordance with an alternative exemplary embodiment of the present invention. In step 1005, a plurality of circuit emulation data flows can be established between a first network node and at least a second network node. A substantially identical data transmission rate can be assigned to each circuit emulation data flow. In step 1010, the quantity of frames of data in each transmission can be varied to modulate the amount of data transmitted in each circuit emulation data flow such that the plurality of circuit emulation data flows are substantially independent of each other. The modulation can be performed in any appropriate manner. For example, the amount of data transmitted in one or more circuit emulation data flows can be modulated using a saw-wave, triangular, Gaussian, sinusoidal, or other suitable type of modulation input. The average of the quantity of frames of data transmitted in each circuit emulation data flow can be substantially equal to the data transmission rate. In step 1015, the quantity of frames of data in each transmission can be suitably controlled to ensure that the plurality of circuit emulation data flows are substantially independent of each other.

Figure 11:
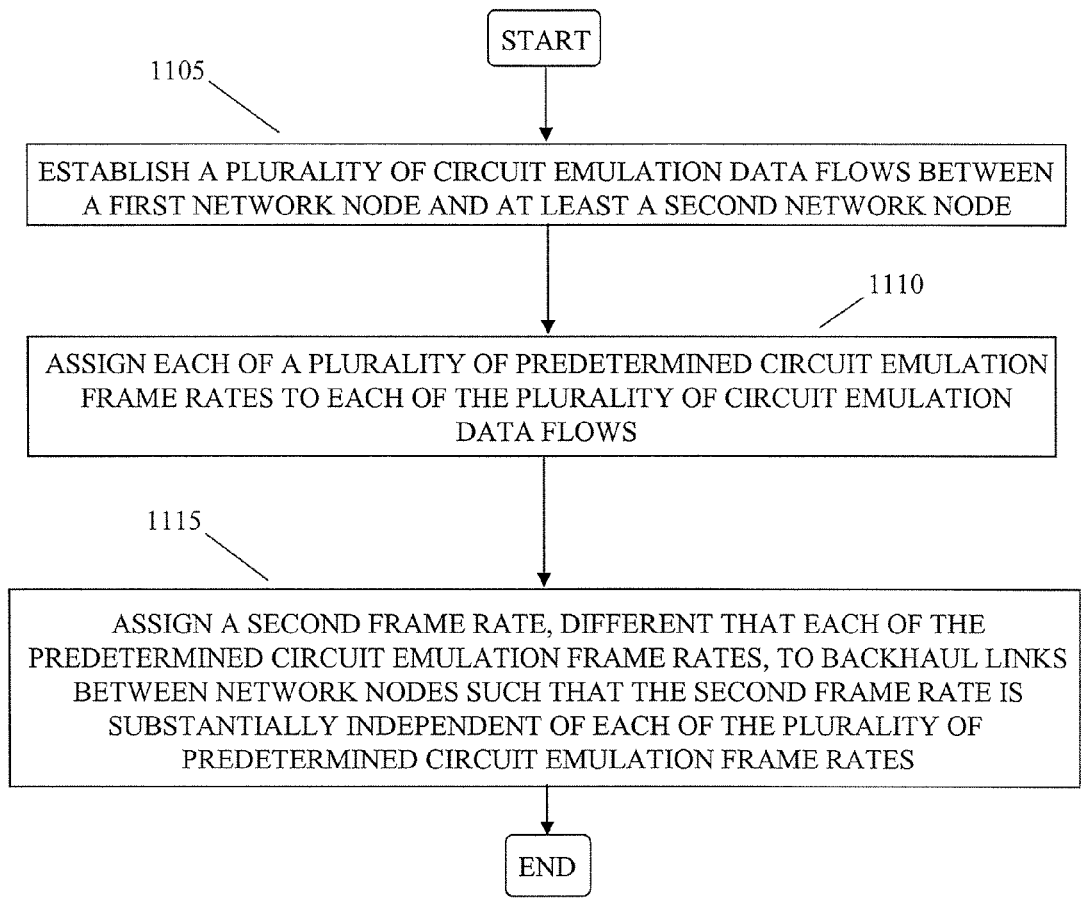
FIG. 11 is a flowchart illustrating steps for managing information communication in a network, in accordance with an alternative exemplary embodiment of the present invention.

FIG. 11 is a flowchart illustrating steps for managing information communication in a network, in accordance with an alternative exemplary embodiment of the present invention. In step 1105, a plurality of circuit emulation data flows can be established between a first network node and at least a second network node. In step 1110, each of a plurality of predetermined circuit emulation frame rates can be assigned to each of the plurality of circuit emulation data flows. In step 1115, a second frame rate, different than each of the predetermined circuit emulation frame rates, can be assigned to backhaul links between network nodes such that the second frame rate is substantially independent of each of the plurality of predetermined circuit emulation frame rates. The backhaul links can comprise WiMax backhaul links, such as, for example, time division duplexing WiMax backhaul links or the like. According to an exemplary embodiment, the second frame rate can be substantially independent of each of the plurality of predetermined circuit emulation frame rates to mitigate non-linearities in jitter variations of the plurality of circuit emulation data flows. Each of the plurality of predetermined circuit emulation frame rates can comprise a different data transmission rate such that the frequency of communicated packets is different for each circuit emulation data flow to make each of the plurality of circuit emulation data flows substantially independent of each other.

Figure 12:
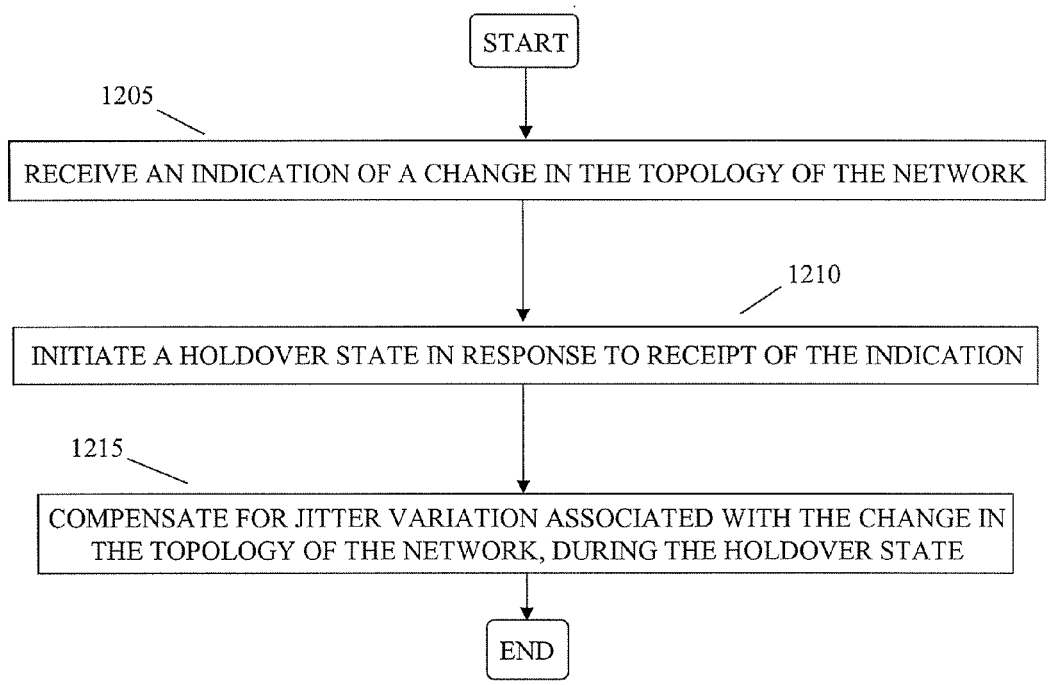
FIG. 12 is a flowchart illustrating steps for managing information communication in a network, in accordance with an alternative exemplary embodiment of the present invention.

FIG. 12 is a flowchart illustrating steps for managing information communication in a network, in accordance with an alternative exemplary embodiment of the present invention. In step 1205, an indication of a change in the topology of the network is received. In step 1210, a holdover state is initiated in response to receipt of the indication. In step 1215, jitter variation associated with the change in the topology of the network is compensated for during the holdover state. According to exemplary embodiments, the jitter variation can be compensated for by, for example, generating a step change in relative jitter delay. Additionally or alternatively, the standard deviation of the jitter variation can be adjusted in accordance with traffic loading in the network.

Figure 13:
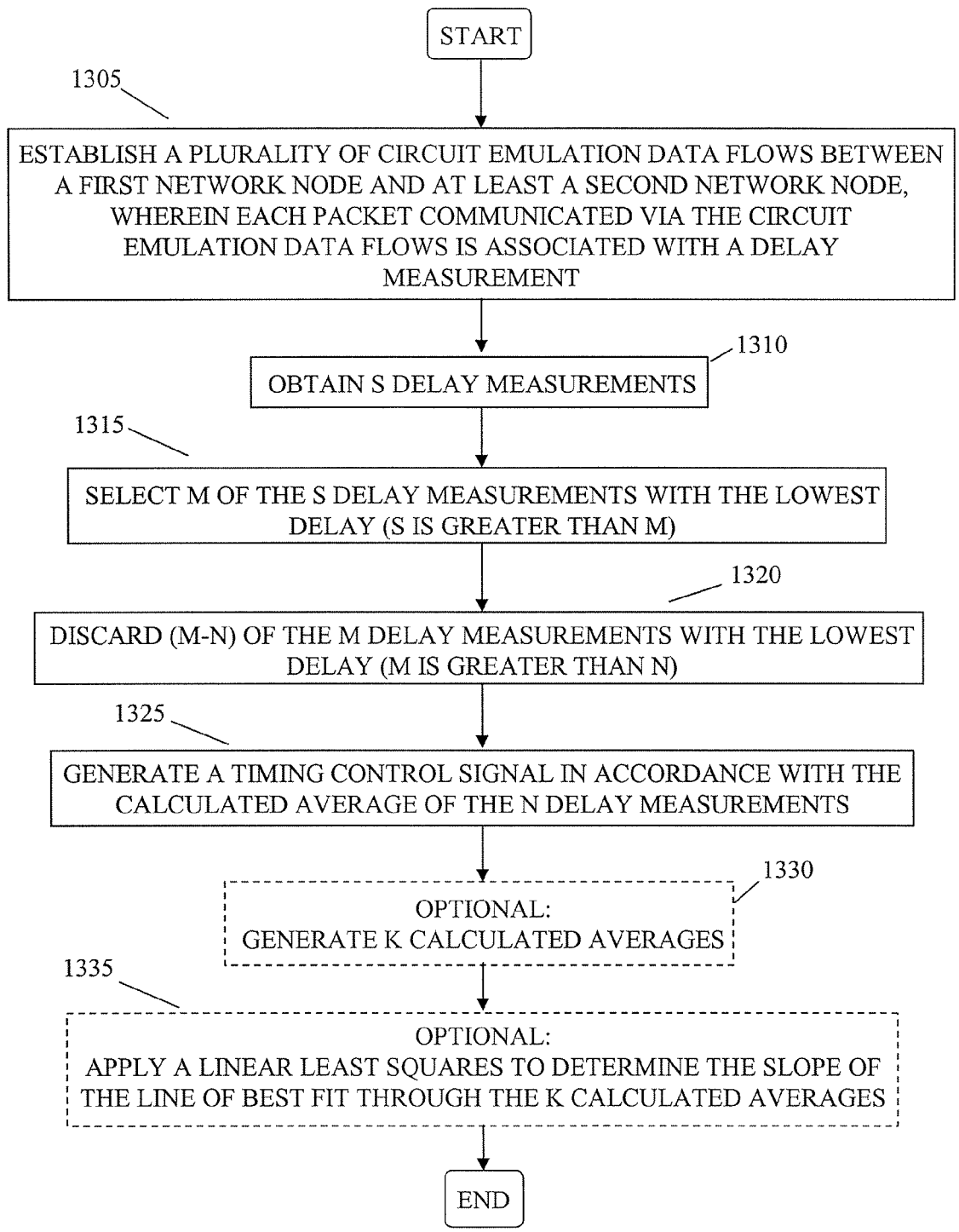
FIG. 13 is a flowchart illustrating steps for managing information communication in a network, in accordance with an alternative exemplary embodiment of the present invention.

FIG. 13 is a flowchart illustrating steps for managing information communication in a network, in accordance with an alternative exemplary embodiment of the present invention. In step 1305, a plurality of circuit emulation data flows can be established between a first network node and at least a second network node. Each packet communicated via the circuit emulation data flows is associated with a delay measurement. In step 1310, S delay measurements can be obtained (where S can be any suitable number). In step 1315, M of the S delay measurements with the lowest delay can be selected, in which S is greater than M (e.g., S can be much greater than M). In step 1320, (M-N) of the M delay measurements with the lowest delay can be discarded, in which M is greater than N. In step 1325, a timing control signal can be generated in accordance with the calculated average of the N delay measurements. According to exemplary embodiments, the calculated average can comprise a linear average of the N delay measurements. Alternatively, the calculated average can comprise a weighted average of the N delay measurements. For example, the lead packet can comprise the highest weight and each of the plurality of trailing packets can comprise a successively lesser weight. The timing control signal can be configured to provide phase locking of a generated clock of the network node to a source clock. To improve timing recovery, packets that are outside of a predetermined jitter variance of a lead packet can be discarded. Additionally or alternatively, the current calculated average can be discarded and the previous calculated average can be maintained when substantially all of the packets are outside of a predetermined range of delay measurement values. Optionally, in step 1330, K calculated averages can be generated (where K can be any suitable number). Optionally, in step 1335, a linear least squares can be applied to determine the slope of the line of best fit through the K calculated averages. According to an exemplary embodiment, the slope of the line can comprise an estimate of the rate of change of delay, and the rate of change of delay can comprise the frequency error between the generated clock of the network node and the source clock.

FIG. 14 is a flowchart illustrating steps for managing information communication in a network, in accordance with an alternative exemplary embodiment of the present invention. In step 1405, a plurality of circuit emulation data flows can be established between a first network node and at least a second network node. Each packet communicated via the circuit emulation data flows is associated with a delay measurement. In step 1410, an estimate of the mean packet delay for the fastest M packets (where M can be any suitable number) arriving via the circuit emulation data flows can be generated. The estimated mean packet delay can be generated in any suitable manner, such as, for example, by performing Kalman filtering or other suitable estimation technique. In step 1415, a timing control signal can be generated in accordance with the mean and/or the variance of the estimated mean packet delay. For example, the variance of the estimated mean packet delay can be utilized inversely as a multiplication factor to generate an update to the estimated mean packet delay. The timing control signal can be configured to provide phase locking of a generated clock of the network node to a source clock.

The methods illustrated in FIGS. 8-14 can be configured to communicate information in any suitable type of packet-based network capable of carrying circuit emulation traffic, either wireless or wired, such as, for example, a wireless mesh network or the like, using any suitable wireless or wired communication protocol or standard. For example, the methods illustrated in FIGS. 8-14 can be compatible with any suitable communication standard including, but not limited to, I.E.E.E. 802.11, 802.11a, 802.11b, 802.11g, 802.11n, 802.11s, 802.16 and 802.20, or any other suitable wireless or wired standard. For example, exemplary embodiments can also be used in any suitable type of wired network in which packet jitter can pose difficulties and, therefore, timing recovery is necessary.

Any combination or all of the steps of a computer program as illustrated in FIGS. 8-14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used as at least part of an information communication system. For example, exemplary embodiments can be used in systems for communicating information over communication channels either wirelessly or by wired means. However, the network nodes with associated timing recovery modules according to exemplary embodiments can be used in any suitable device or system that communicates information, including both wired and wireless communication systems.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and patent applications, foreign patents and patent applications, and publications discussed above are hereby incorporated by reference herein in their entireties to the same extent as if each individual patent, patent application, or publication was specifically and individually indicated to be incorporated by reference in its entirety.

What is claimed is:

1. A system for managing information communication in a network, comprising:
   a plurality of network nodes,
   wherein a plurality of circuit emulation data flows are established between a first network node and at least a second network node, the plurality of circuit emulation data flows having (i) a first circuit emulation data flow with a first data transmission rate and (ii) a second circuit emulation data flow with a second data transmission rate, the first circuit emulation data flow having a first timing-recovery portion, and the second circuit emulation data flow having a second timing-recovery portion, and
   a module configured to alter the first data transmission rate of the first circuit emulation data flow so as to be substantially different than the second transmission rate of the second circuit emulation data flow to cause reduction of non-linear jitter caused by beating between said first circuit emulation data flow and said second circuit emulation data flow, wherein the plurality of circuit emulation data flows comprise T1 pseudowire circuit emulation for cellular base stations.

2. The system according to claim 1, wherein the the recovered clock recovery is required to meet a 50 ppb clock.

3. A system for managing information communication in a network, comprising:
   a plurality of network nodes, wherein a circuit emulation data flow is established between a first network node and a second network node,
   wherein the circuit emulation data flow comprises (i) a timing-recovery circuit emulation transmit data flow and (ii) a timing-recovery circuit emulation receive data flow, and
   a module configured to alter a data transmission rate of one of (i) the timing-recovery circuit emulation transmit data flow and (ii) the timing-recovery circuit emulation receive data flow, such that their data transmission rates are different from one another, to cause reduction of non-linear jitter caused by beating between said timing-recovery circuit emulation transmit data flow and said timing-recovery circuit emulation receive data flow, wherein the circuit emulation data flow comprises a T1 pseudowire circuit emulation for cellular base stations.

4. The system of claim 3, wherein the data transmission rates of plural non-timing circuit emulation data flows are substantially identical.

5. The system of claim 4, wherein said module comprises a timing recovery module configured to compensate for jitter variations resulting from beating of the transmit and receive data flows.

6. The system of claim 3, wherein said module comprises a management module in communication with the plurality of network nodes, wherein the management module is configured to monitor and control the data transmission rates of the timing-recovery data flows to ensure that the transmit data flow and the receive data flow are substantially different from each other.

7. The system of claim 6, wherein the management module is configured to monitor and control the data transmission rates of the timing-recovery data flows to ensure that the transmit and receive data flows are substantially different from the rates of synchronous time division duplexing (TDD) backhaul links.

8. The system of claim 3, wherein the network comprises a multi-hop wireless mesh network including a plurality of second nodes, where timing-recovery data flows are terminated at each second node.

9. The system of claim 7, wherein the management module is configured to monitor and control the data transmission rates of the timing-recovery data flows to ensure that the transmit and receive data flows are substantially different from the rates of at least one of (i) synchronous frequency division duplexing (FDD) backhaul links, and (ii) combined TDD/FDD backhaul links that are transporting the timing-recovery data flows.

10. A system for managing information communication in a network, comprising:
    a plurality of network nodes,
    wherein a plurality of circuit emulation data flows are established between a first network node and at least a second network node,
    wherein a substantially identical data transmission rate is assigned to each non timing-recovery circuit emulation data flow, and
    a module configured to change a number of frames of data in at least one timing-recovery circuit emulation data flow so as to modulate an amount of data transmitted in said at least one timing recovery circuit emulation data flow such that the transmission rate of said at least one timing-recovery circuit emulation data flow is substantially different from (i) the transmission rate of another timing-recovery circuit emulation data flow and (ii) the transmission rate of at least one non-timing circuit emulation data flow, to cause reduction of non-linear jitter caused by beating between said at least one timing-recovery circuit emulation data flow and said another timing-recovery circuit emulation data flow, wherein the plurality of circuit emulation data flows comprise T1 pseudowire circuit emulation for cellular base stations.

11. The system of claim 10, wherein the amount of data transmitted in at least one circuit emulation data flow is modulated using a saw wave modulation.

12. The system of claim 10, wherein the amount of data transmitted in at least one circuit emulation data flow is modulated using a Gaussian modulation.

13. The system of claim 10, wherein the amount of data transmitted in at least one circuit emulation data flow is modulated using a sinusoidal modulation.

14. The system of claim 10, further comprising a management module in communication with the plurality of network nodes, wherein the management module is configured to monitor and control the number of frames of data in each transmission to ensure that the plurality of circuit emulation data flows are substantially different from each other.

15. The system of claim 10, wherein the network comprises a multi-hop wireless mesh network including a plurality of second nodes, where timing-recovery data flows are terminated at each second node.

16. A system for managing communication of information in a network, comprising:
a plurality of wireless communication network nodes,
wherein a plurality of circuit emulation data flows are established between a first wireless network node and at least a second wireless network node, the plurality of circuit emulation data flows having (i) a first circuit emulation data flow with a first frame rate and (ii) a second circuit emulation data flow with a second frame rate, the first circuit emulation data flow having a first timing-recovery circuit portion, and the second circuit emulation data flow having a second timing-recovery circuit portion,
a module configured to alter the first frame rate to a third frame rate, different than each of the first and second frame rates, such that the third frame rate is substantially different from each of the first and second frame rates to cause reduction of non-linear jitter caused by beating between said first timing-recovery emulation data flow and said second timing-recovery emulation data flow, wherein the plurality of circuit emulation data flows comprise T1 pseudowire circuit emulation for cellular base stations.

17. The system of claim 16, wherein the third frame rate is substantially different from the other frame rates to mitigate jitter variations of the plurality of circuit emulation data flows.

18. The system of claim 16, wherein each of the first and second frame rates comprises a substantially different data transmission rate.

19. The system of claim 16, wherein the communications between the plurality of wireless communication network nodes comprise backhaul links, which comprise WiMax backhaul links.

20. The system of claim 19, wherein the WiMax backhaul links comprise time division duplexing WiMax backhaul links.

21. The system of claim 16, wherein the network comprises a multi-hop wireless mesh network including a plurality of second nodes, where timing-recovery data flows are terminated at each second node.

22. A method of managing information communication in a network, comprising the steps of:
establishing a plurality of circuit emulation data flows between a first wireless network node and at least a second wireless network node; and
assigning a data transmission rate to each circuit emulation data flow;
changing a data transmission rate of at least one of the circuit emulation data flows such that the data transmission rate of at least one timing-recovery circuit emulation data flow is substantially different from the data transmission rate of at least one non-timing-recovery circuit emulation data flow to cause reduction of non-linear jitter caused by beating between said plurality of circuit emulation data flows, wherein the plurality of circuit emulation data flows comprise T1 pseudowire circuit emulation for cellular base stations.

23. A method of managing information communication in a network, comprising the steps of:
establishing a circuit emulation data flow between a first wireless network node and a second wireless network node, wherein the circuit emulation data flow comprises an emulation transmit data flow and an emulation receive data flow, wherein one of said emulation transmit data flow and said emulation receive data flow comprises a timing-recovery data flow and the other of said emulation transmit data flow and said emulation receive data flow comprises a non-timing-recovery data flow;
assigning a first data transmission rate to the emulation transmit data flow and a second data transmission rate to the emulation receive data flow; and
changing the data transmission rate of the timing-recovery data flow so that it is substantially different from the data transmission rate of the non-timing-recovery data to cause reduction of non-linear jitter caused by beating between the emulation transmit data flow and the emulation receive data flow, wherein the emulation transmit data flow and the emulation receive data flow comprise T1 pseudowire circuit emulation for cellular base stations.

24. The method of claim 23, wherein the data transmission rates of plural non-timing-recovery data are substantially identical.

25. The method of claim 23, comprising the step of controlling the first and second data transmission rates to ensure that the transmit data flow and the receive data flow are effectively orthogonal to each other.

26. The method of claim 25, wherein the controlling step comprises the step of controlling the first and second data transmission rates to ensure that the transmit and receive data flows are effectively orthogonal to synchronous time division duplexing (TDD) backhaul links.

27. The method of claim 23, wherein the network comprises a wireless mesh network.

28. The method of claim 26, wherein the controlling step comprises the step of controlling the first and second data transmission rates to ensure that the transmit and receive data flows are effectively orthogonal to at least one of (i) synchronous frequency division duplexing (FDD) backhaul links, and (ii) combined TDD/FDD backhaul links.

29. A method of managing communication of information in a network, comprising the steps of:

establishing a plurality of circuit emulation data flows between a first wireless network node and at least a second wireless network node, wherein a substantially identical data transmission rate is assigned to each circuit emulation data flow; and changing the data transmission rate of at least one of the circuit emulation data flows to be different than the data transmission rate of at least one other of the circuit emulation data flows by varying a number of frames of data in a transmission to modulate an amount of data transmitted in the at least one circuit emulation data flow such that the number of frames of at least one timing-recovery circuit emulation data flow is substantially different from (i) the number of frames of another timing-recovery circuit emulation data flow and (ii) the number of frames of at least one non-timing-recovery circuit emulation data flow, wherein the plurality of circuit emulation data flows comprise T1 pseudowire circuit emulation for cellular base stations.

30. The method of claim 29, wherein the varying step comprises the step of saw-wave modulating the amount of data transmitted in at least one circuit emulation data flow.

31. The method of claim 29, wherein the varying step comprises the step of Gaussian modulating the amount of data transmitted in at least one circuit emulation data flow.

32. The method of claim 27, wherein the varying step comprises the step of sinusoidally modulating the amount of data transmitted in at least one circuit emulation data flow.

33. The method of claim 29, further comprising the step of controlling the number of frames of data in each transmission to ensure that the plurality of circuit emulation data flows are effectively orthogonal to each other.

34. The method of claim 29, wherein the network comprises a wireless mesh network.

35. A method of managing communication of information in a network, comprising the steps of:

a.) establishing a plurality of circuit emulation data flows between a first wireless network node and at least a second wireless network node;

b.) assigning each of a plurality of predetermined circuit emulation frame rates to corresponding ones of the plurality of circuit emulation data flows; and c.) changing a frame rate of a first timing-recovery circuit emulation data flow to be a second frame rate substantially different than each of the predetermined circuit emulation frame rates to mitigate jitter variations of the plurality of circuit emulation data flows, and wherein the first timing-recovery emulation frame rate is substantially different from a second timing-recovery emulation frame rate, wherein the plurality of circuit emulation data flows comprise T1 pseudowire circuit emulation for cellular base stations.

36. The method of claim 35, wherein each of the plurality of predetermined circuit emulation frame rates comprises a different data transmission rate such that the frequency of communicated packets is different for each circuit emulation data flow to make each of the plurality of circuit emulation data flows effectively orthogonal to each other.

* * * * *

UNITED STATES PATENT AND TRADEMARK OFFICE
CERTIFICATE OF CORRECTION

| | |
|---|---|
| PATENT NO. | : 8,400,911 B2 |
| APPLICATION NO. | : 11/674001 |
| DATED | : March 19, 2013 |
| INVENTOR(S) | : Smith et al. |

It is certified that error appears in the above-identified patent and that said Letters Patent is hereby corrected as shown below:

In the Specifications:

In Column 1, Line 32, delete "(P2 MP)," and insert -- (P2MP), --, therefor.

In Column 1, Line 33, delete "(MP2 MP)." and insert -- (MP2MP). --, therefor.

In Column 15, Line 61, delete "2101B." and insert -- 210B. --, therefor.

In Column 15, Line 65, delete "2101B" and insert -- 210B --, therefor.

In Column 16, Line 12, delete "2101B," and insert -- 210B, --, therefor.

In the Claims:

In Column 25, Line 66, in Claim 2, delete "the the" and insert -- the --, therefor.

Signed and Sealed this
Thirteenth Day of August, 2013

Teresa Stanek Rea
*Acting Director of the United States Patent and Trademark Office*